(12) United States Patent
Akabane et al.

(10) Patent No.: US 7,523,036 B2
(45) Date of Patent: *Apr. 21, 2009

(54) TEXT-TO-SPEECH SYNTHESIS SYSTEM

(75) Inventors: Makoto Akabane, Tokyo (JP); Hajime Yano, Kanagawa (JP); Keiichi Yamada, Tokyo (JP); Goro Shiraishi, Tokyo (JP); Junichi Kudo, Tokyo (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 271 days.

This patent is subject to a terminal disclaimer.

(21) Appl. No.: 11/385,210

(22) Filed: Mar. 21, 2006

(65) Prior Publication Data

US 2006/0161437 A1    Jul. 20, 2006

Related U.S. Application Data

(63) Continuation of application No. 10/161,329, filed on May 31, 2002, now Pat. No. 7,099,826.

(30) Foreign Application Priority Data

Jun. 1, 2001    (JP)    ............... JP2001-167416

(51) Int. Cl.
G10L 13/08    (2006.01)
(52) U.S. Cl. ....................... 704/260
(58) Field of Classification Search ............. 704/260
See application file for complete search history.

(56) References Cited

U.S. PATENT DOCUMENTS 6,049,787 A    4/2000    Takahashi
6,081,780 A    6/2000    Lumelsky
6,246,672 B1    6/2001    Lumelsky

*Primary Examiner*—Susan McFadden
(74) *Attorney, Agent, or Firm*—Wolf, Greenfield & Sacks, P.C.

(57) ABSTRACT

The present invention is intended to provide a text-to-speech synthesis apparatus, including a storage for storing phoneme data of a plurality of speakers; a selector for selecting one of the plurality of speakers in accordance with an operation performed by a user; a searcher for searching the storage for phoneme data of the speaker selected by the selector; a text-to-speech synthesis processor for linking the phoneme data of the speaker retrieved by the searcher to convert input data into a synthetic speech; and a fee-charge controller for controlling a fee-charge operation for the user in accordance with the phoneme data selected by the selector. Consequently, the user can perform text-to-speech synthesis on the desired input data such as drama data by use of the obtained phoneme data.

50 Claims, 22 Drawing Sheets

TEXT-TO-SPEECH SYNTHESIS SYSTEM

CROSS REFERENCES TO RELATED APPLICATIONS

This application is a continuation of application Ser. No. 10/161,329, filed on May 31, 2002, entitled "Text-to-Speech Synthesis System."

BACKGROUND OF THE INVENTION

The present invention relates generally to a text-to-speech synthesis system capable of generating synthetic speech in accordance with drama data for example on the basis of user-specified phoneme data.

Conventional text-to-speech synthesis apparatuses performs language analysis on entered character data and link the analyzed character data with phoneme data stored in their storage sections in accordance with predetermined rules to generate synthetic speech. These text-to-speech synthesis apparatuses may link the character data with stored male phoneme data or female phoneme data for example to sound the character data in male or female voice.

Some writers want to their novels and dramas for example to be recited by their favorite readers such as actors and actresses for example. Actually, however, the achievement of this objective is very difficult because these writers must pay costly recitation fees and make the cumbersome arrangements with readers such as their work schedules, for example. Especially, for amateur writers, it is virtually impossible to make their writings be recited by professional readers.

Normally, the above-mentioned conventional text-to-speech synthesis apparatuses can generate synthetic speech only on the basis of the phoneme data stored in their storage sections and therefore cannot generate the synthetic speech of user's specified readers.

SUMMARY OF THE INVENTION

It is therefore an object of the present invention to provide a text-to-speech synthesis system which is capable of easily making input data such as user-written drama data for example be recited by user's desired readers.

It is another object of the present invention to provide a text-to-speech synthesis system which allows users to cast desired readers such as actors or voice actors to the input data of user's writings such as drama and allows these input data to be recited by user's desired readers.

It is still another object of the present invention to provide a text-to-speech synthesis system which can charge users for the services of text-to-speech synthesis requested by the users.

In carrying out the invention and according to one aspect thereof, there is provided a text-to-speech synthesis apparatus, including: a storage for storing phoneme data of a plurality of speakers; a selector for selecting one of the plurality of speakers in accordance with an operation performed by a user; a searcher for searching the storage for phoneme data of the speaker selected by the selector; a text-to-speech synthesis processor for linking the phoneme data of the speaker retrieved by the searcher to convert input data into a synthetic speech; and a fee-charge controller for controlling a fee-charge operation for the user in accordance with the phoneme data selected by the selector.

In carrying out the invention and according to another aspect thereof, there is provided a communication apparatus, including: a storage for storing phoneme data of a plurality of speakers; a receiver for receiving speaker identification data for identifying any one of the plurality of speakers, the speaker identification data being selected by a user on another apparatus and supplied therefrom to the communication apparatus; a searcher for searching the storage for phoneme data which correspond to the speaker identification data received by the receiver; a transmitter for transmitting the phoneme data retrieved by the searcher to the another apparatus; and a fee-charge controller for controlling a fee-charge operation for the user in accordance with the phoneme data transmitted from the transmitter.

In carrying out the invention and according to still another aspect thereof, there is provided a text-to-speech synthesis apparatus, including: a selector for selecting a speaker as specified by a user; a transmitter for transmitting speaker identification data for identifying the speaker selected by the selector to another apparatus; a receiver for receiving phoneme data of the speaker corresponding to the speaker identification data transmitted from the transmitter; a text-to-speech synthesis processor for linking the phoneme data of the speaker received by the receiver to convert input data into a synthetic speech; and a fee-charge controller for controlling a fee-charge operation for the user in accordance with the phoneme data received by the receiver.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

Figure 1:
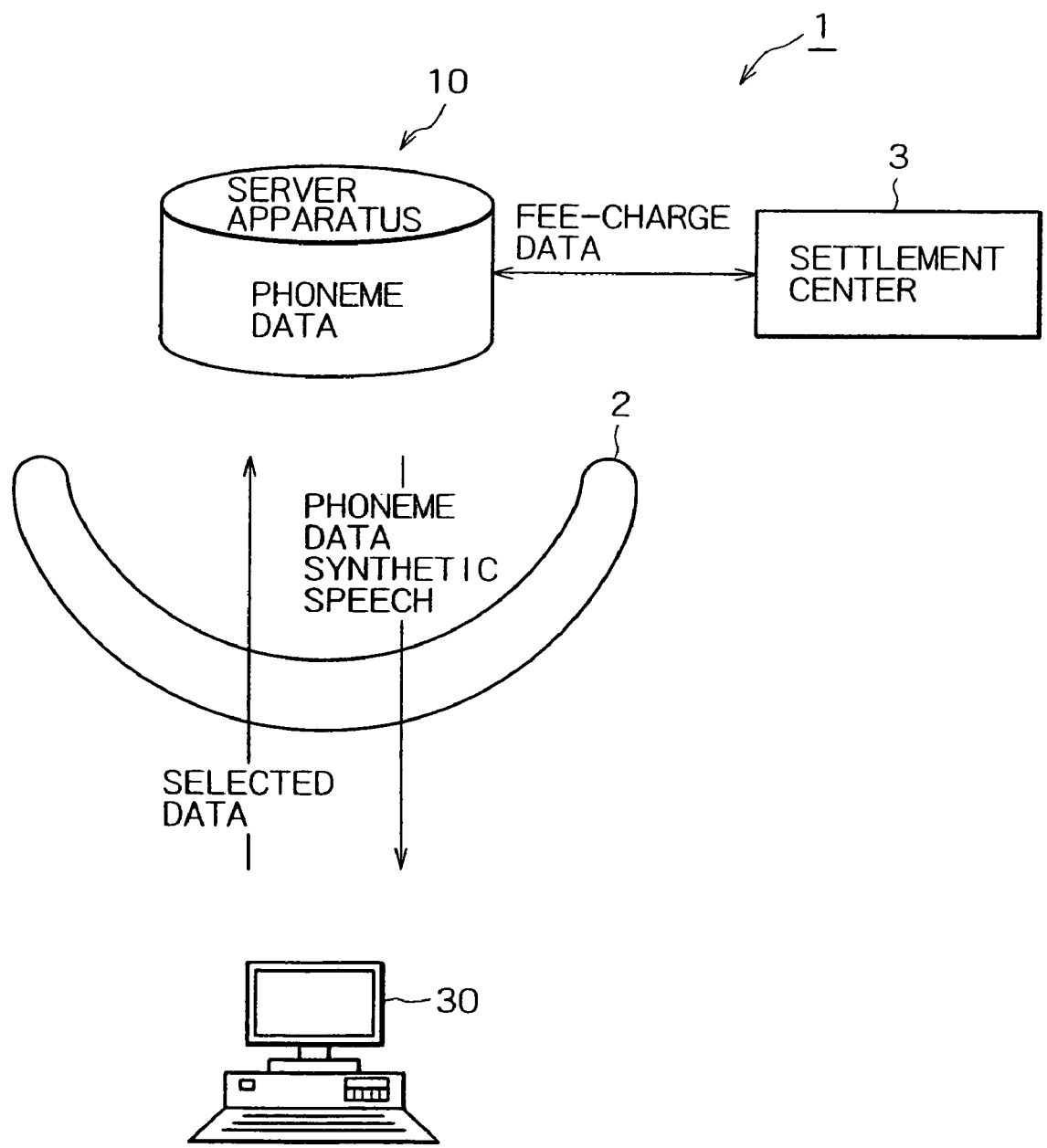
FIG. 1 is a schematic block diagram illustrating an exemplary configuration of a text-to-speech synthesis system practiced as one embodiment of the invention.

This invention will be described in further detail by way of example with reference to the accompanying drawings. Now, referring to FIG. 1, a text-to-speech synthesis system 1 includes a server apparatus 10 which stores the phoneme data of a plurality of actors and voice actors for example and a terminal apparatus 30 which accesses the server apparatus 10 to download desired phoneme data. The server apparatus 10 and the terminal apparatus 30 are interconnected via a network 2 which is an ISDN (Integrated Services Digital Network), a CATV (Cable Television) network, or a optical cable network for example to transfer data on the basis of a transmission protocol such as TCP/IP (Transmission Control Protocol/Internet Protocol) or FTP (File Transfer Protocol) for example. The server apparatus 10 is also connected to a settlement center 3 via a dedicated line such that, when a user has downloaded phoneme data or synthetic speech for example from the server apparatus 10, the server apparatus 10 executes fee-charge processing and sends the fee-charge data to the settlement center 3.

In the above-mentioned text-to-speech synthesis system 1, the user accesses from the terminal apparatus 30 to the server apparatus 10 to download desired phoneme data and performs text-to-speech synthesis processing at the terminal apparatus 30 to read aloud a desired drama or novel for example at the terminal apparatus 30. Also, the user can upload drama data for example from the terminal apparatus 30 to the server apparatus 10 and then download a synthetic speech corresponding to the drama data generated by use of the phoneme data of a desired speaker from the server apparatus 10, thereby listening the drama data read aloud by the desired speaker.

It should be noted that the phoneme data to be provided from the server apparatus 10 to the terminal apparatus 30 may be of any type. For example, the phoneme data may be of celebrities and entertainers (actors, actresses, voice actors, politicians, and so on) regardless of their nationalities and of any generations (infants, grade-schoolers, junior high school students, high school students, college students, full members of society, and so on). In addition, the phoneme data may be of historical characters of which speeches were synthetically reproduced from their skull contours or pictures, characters in movies or animations, or excavated bronze or stone figures. Namely, the phoneme data stored in the server apparatus 10 are determined by preference of the user of the terminal apparatus 30 which accesses the server apparatus 10.

Figure 2:
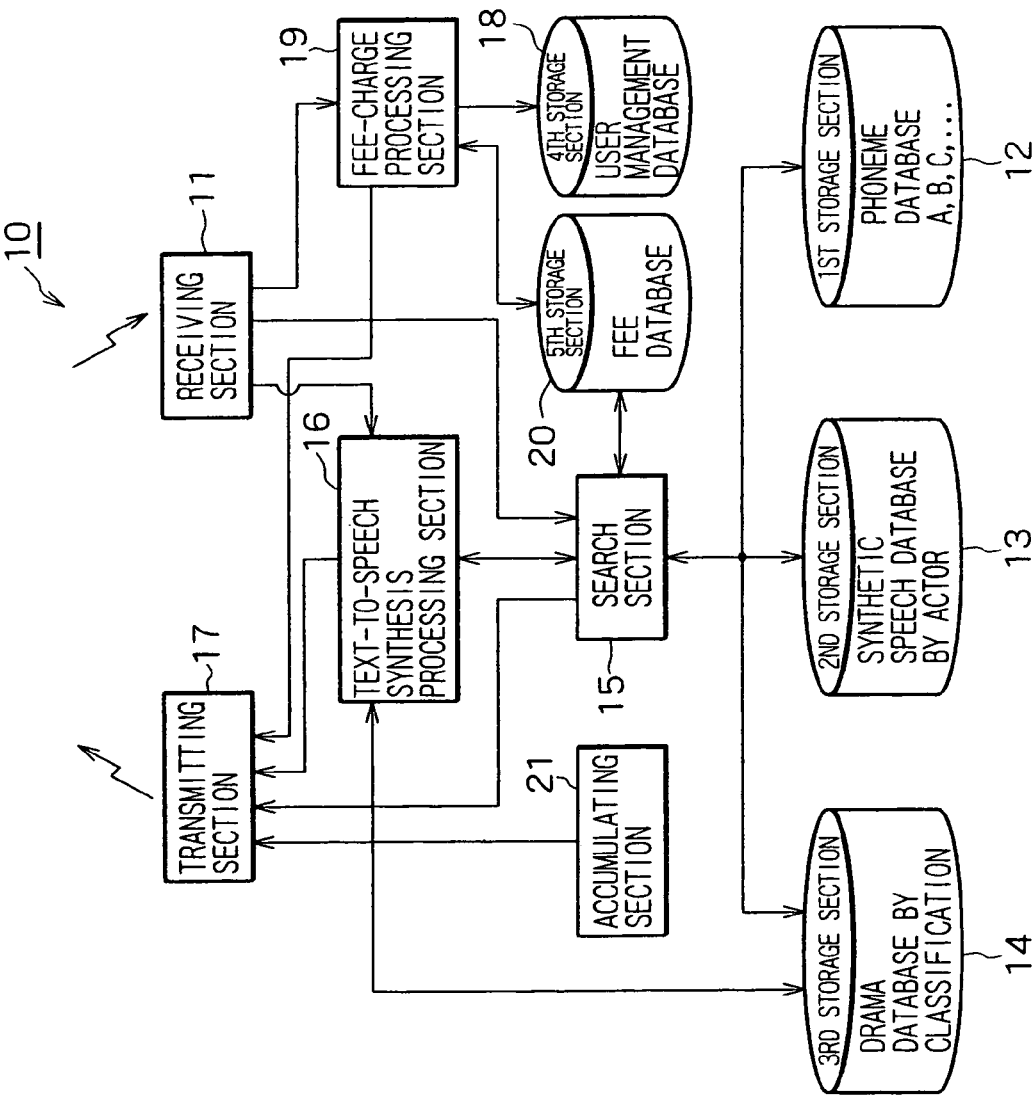
FIG. 2 is a schematic block diagram illustrating an exemplary configuration of a server apparatus.

The following describes the server apparatus 10 to which the present invention is applied, with reference to FIG. 2.

The server apparatus 10 has substantially the same configuration as that of a personal computer for example and including a receiving section 11 for receiving data and so on supplied from the terminal apparatus 30, a first storage section 12 in which a phoneme database storing the phoneme data of a plurality of speakers is constructed, a second storage section 13 in which a synthetic speech database storing the synthetic speeches of a plurality of speakers is constructed, a third storage section 14 in which a drama database storing dramas and novels for example is constructed, a search section 15 for searching the databases stored in the first through third storage sections 12 through 14, a text-to-speech synthesis processing section 16 for generating synthetic speech on the basis of the phoneme data retrieved by the search section 15, and a transmitting section 17 for transmitting phoneme data and synthetic speech to the terminal apparatus 30. The server apparatus 10 also includes a fourth storage section 18 in which a user management database is constructed, a fee-charge processing section 19 for generating fee-charge data for charging the user for downloaded phoneme data for example and recording the generated fee-charge data to the user management database, a fifth storage section 20 in which a fee database for each speaker is constructed, and a accumulating section 21 for accumulating the image data for configuring a home page for providing the present text-to-speech synthesis system 1.

The receiving section 11 receives speaker select data for example supplied from the terminal apparatus 30. Then, receiving the select data, the receiving section 11 outputs them to the search section 15 as a search condition for searching the databases constructed in the first through third storage sections 12 through 14 and 20. Also, receiving purchase data such as phoneme data, the receiving section 11 outputs the received purchase data for executing fee-charge processing on the user to the fee-charge processing section 19.

The first storage section 12 contains the phoneme database which stores phoneme data for each speaker. This phoneme database allows the searching of the phoneme data by male or female, human being or animal, alphabetically or the Japanese syllabary.

The second storage section 13 contains a synthetic speech database. The synthetic speech database holds the synthetic speeches of the speakers of the phoneme data requested from the terminal apparatus 30 for downloading. The synthetic speeches stored in the second storage section 13 are retrieved so that the user can listen to the voice of the speaker selected by the user when the phoneme data of that speaker are retrieved from the first storage section 12 for example. Obviously, the synthetic data may be searched for synthetic speeches by substantially similar conditions as those of the phoneme database. It should be noted that the synthetic speeches to be stored in the second storage section 13 are generated on the basis of the representative works for example of speakers.

In the third storage section 14, a drama database is constructed in which drama data are stored as classified by writer. The drama database is adapted so that dramas and so on are searched for by writer's name, genre (love story, novel, SF (Science Fiction), mystery, comedy, and so on). It should be noted that this drama database also stores novels and song words for example.

The search section 15 searches the databases constructed in the first through third storage sections 12 through 14 and 20 for the data specified by the user. Namely, when searching the phoneme database constructed in the first storage section 12, the search section 15 searches for the phoneme data of the speaker indicated by the speaker select data entered from the receiving section 11, extracts the phoneme data from the first storage section 12, and outputs the extracted phoneme data to the text-to-speech synthesis processing section 16. When searching the synthetic speech database constructed in the second storage section 13, the search section 15 searches for the synthetic speech of the speaker indicated by the speaker select data entered from the receiving section 11, extracts the synthetic speech from the second storage section 13, and outputs the extracted synthetic speech to the transmitting section 17. Further, when searching the drama database constructed in the third storage section 14, the search section 15 searches for the drama data indicated by the select data entered from the receiving section 11, extracts the drama data from the third storage section 14, and outputs the extracted drama data to the text-to-speech synthesis processing section 16.

The text-to-speech synthesis processing section 16 receives the phoneme data retrieved from the first storage section 12, the drama data retrieved from the third storage section 14 by the search section 15, and the drama data supplied by the user from the terminal apparatus 30 through the receiving section 11. Then, the text-to-speech synthesis processing section 16 generates a synthetic speech from the phoneme data supplied from the search section 15 and the drama data supplied from the search section 15 or the receiving section 11. The text-to-speech synthesis processing section 16 outputs the generated synthetic speech to the transmitting section 17 to send it to the terminal apparatus 30 and, at the same time, registers the generated synthetic speech into the synthetic speech database constructed in the second storage section 13.

Figure 3:
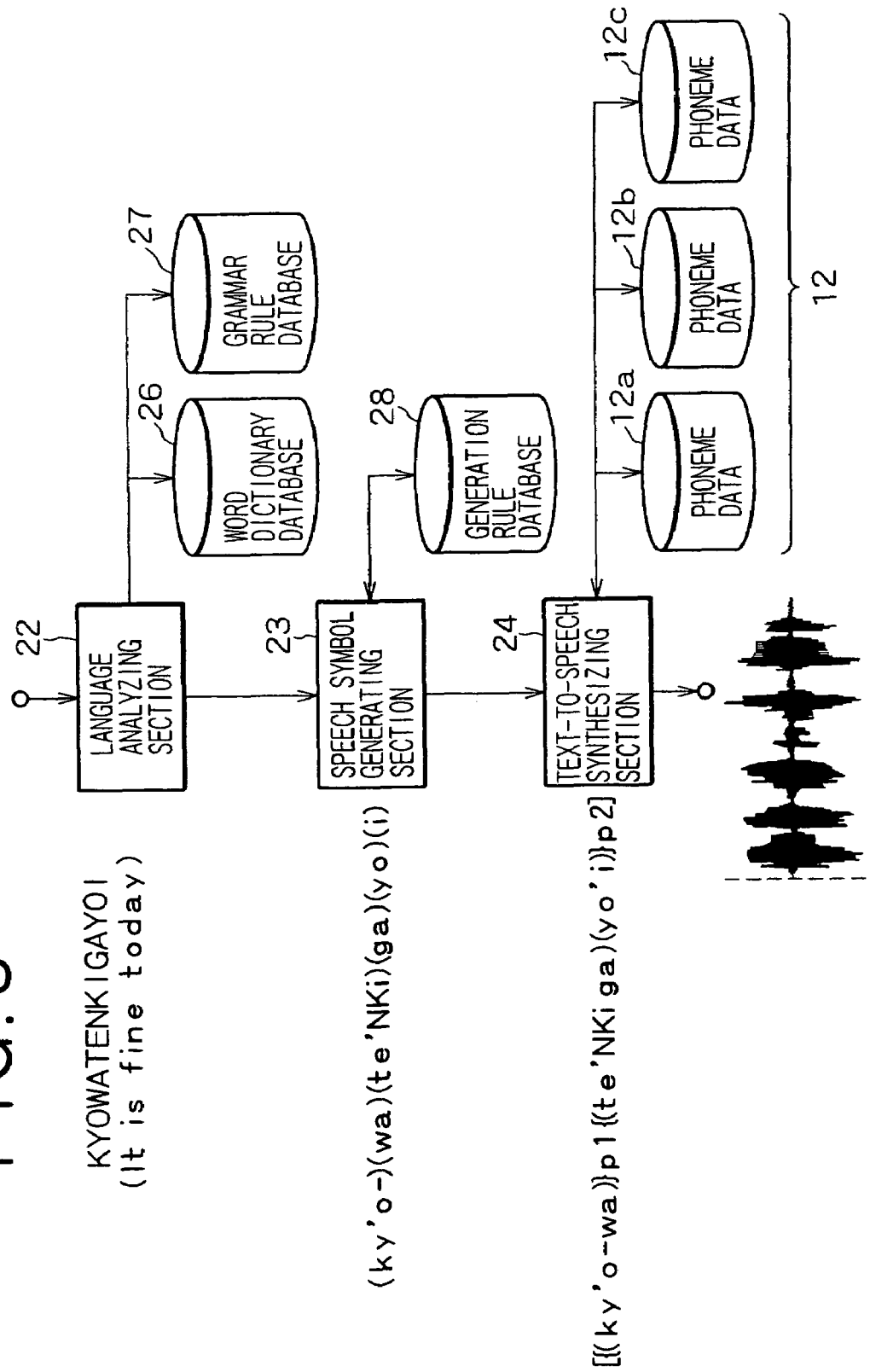
FIG. 3 is a schematic block diagram illustrating an exemplary configuration of a text-to-speech synthesis processing section.
Figure 4:
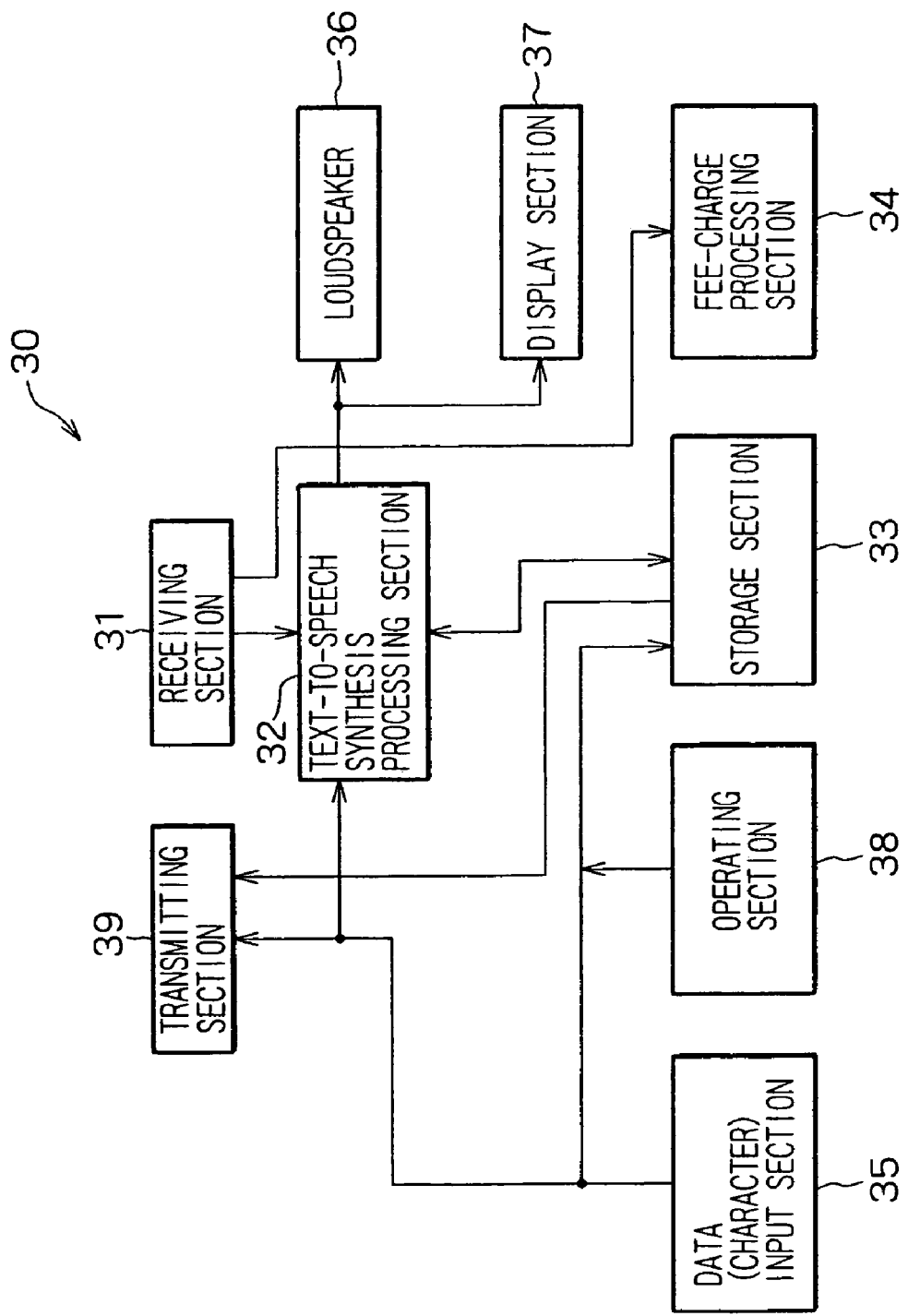
FIG. 4 is a block diagram illustrating an exemplary configuration of a terminal apparatus.

To be more specific, the text-to-speech synthesis processing section 16 includes, as shown in FIG. 3, a language analyzing section 22 which performs language analysis on the drama data received from the search section 15 or the receiving section 11, a speech symbol generating section 23 which generates a sequence of speech symbols, and a text-to-speech synthesizing section 24 which performs speech synthesis from the sequence of speech symbols generated in the speech symbol generating section 23 and the phoneme data.

The language analyzing section 22, upon reception of the drama data retrieved from the third storage section 14 or supplied from the terminal apparatus 30 through the search section 15, performs language analysis on the supplied drama data on the basis of the contents of a word dictionary database 26 and a grammar rule database 27. For example, when drama data "Kyowatenkigayoi (It is fine today)" are supplied, the language analyzing section 22 analyzes these drama data into (ky'o-)(wa)(te'Nki)(ga)(yo)(i) in accordance with the contents of the word dictionary database 26 and the grammar rule database 27.

Next, the speech symbol generating section 23, upon reception of the language analysis data from the language analyzing section 22, generates a sequence of speech symbols on the basis of the contents of a generation rule database 28. For example, when drama data (ky'o-)(wa)(te'Nki")(ga)(yo)(i) are supplied from the language analyzing section 22, the speech symbol generating section 23 generates a sequence of speech symbols like [{(ky'o-wa)}p1{(te'Nkiga)(yo'i)}p2]. It should be noted that "'" denotes an accent position and "p" denotes a pause position.

When the sequence of speech symbols is supplied from the speech symbol generating section 23, the text-to-speech synthesizing section 24 extracts the phoneme data of the speaker indicated by the select data from the phoneme database constructed in the first storage section 12 and links the extracted phoneme data with the sequence of speech symbols. For example, if speaker A is selected, the text-to-speech synthesizing section 24 extracts phoneme data 12a of speaker A and outputs a synthetic speech, or a voice waveform in accordance with [{(ky'o-wa)}p1{(te'Nkiga)(yo'i)}p2].

It should be noted that the text-to-speech synthesizing section 24 may be adapted to generate a synthetic speech on the basis of prosody data made up of pitch, power, and duration of tone, in addition to phoneme data. In this case, a synthetic speech may be generated as if a famous foreign character speaks Japanese, for example. Since prosody data are determines personality, a combination of the phoneme data of voice actor A and the phoneme data of voice actor B may also generate a synthetic speech of voice actor A in the manner of voice actor B. In addition, the text-to-speech synthesizing section 24 may convert one piece of speech data into another.

The transmitting section 17 receives the synthetic speech stored in the second storage section 13 corresponding to the selected data from the search section 15 and receives the synthetic speech generated by the text-to-speech synthesis processing section 16 from the text-to-speech synthesis processing section 16 and transmits these synthetic speeches to the terminal apparatus 30. Also, the transmitting section 17 transmits the image data for providing the present system accumulated in the accumulating section 20 to the terminal apparatus 30.

In the fourth storage section 18, a user management database is constructed. In this user management database, the user IDs who used the present system are related with fee-charge data, purchase logs, and the serial numbers of user's application. The fee-charge processing section 19, upon reception of purchase data at the receiving section 11 from the terminal apparatus 30, searches the fee database 20 to generate fee-charge data and records the generated data to the fourth storage section 18.

The fee database constructed in the fourth storage section 18 stores the fees of the phoneme data for each speaker, the fees of synthetic speech for each speaker, and the fees of dramas and so on. These fees are set so that more popular speakers and writers get higher fees.

The terminal apparatus 30, constituted by an ordinary personal computer for example, includes a receiving section 31 for receiving data and so on from the server apparatus 10, a text-to-speech synthesis processing section 32 for generating a synthetic speech on the basis of phoneme data supplied from the server apparatus 10, a storage section 33 for storing drama data and application for example, a fee-charge processing section 34 for performing fee-charge processing when phoneme data or synthetic speeches are purchased, a data input section 35 from which drama data for example are entered, a loudspeaker 36 for sounding synthetic speeches, a display section 37 consisting of a CRT (Cathode-Ray Tube) or an LCD (Liquid Crystal Display) for example for displaying home pages for example, an operating section 38 composed of a keyboard, a mouse, a numeric key pad, a track ball, and joy stick for example for selecting speakers when generating synthetic speeches and entering data, and a transmitting section 39 for transmitting data to the server apparatus 10.

The receiving section 31 receives the phoneme data and synthetic speeches supplied from the server apparatus 10. The receiving section 31 also receives from the server apparatus 10, the image data and so on which constitute a home page and so on.

As with the text-to-speech synthesis processing section 16 of the server apparatus 10 shown in FIG. 3, the text-to-speech synthesis processing section 32 includes a language analyzing section 22 for performing language analysis on the drama data received from the receiving section 31 or the storage section 33, a speech symbol generating section 23 for generating a sequence of speech symbols on the basis of the analysis results obtained in the language analyzing section 22, and a text-to-speech synthesizing section 24 for performing text-to-speech synthesis on the basis of the sequence of speech symbols generated by the speech symbol generating section 23 and the received phoneme data. The text-to-speech synthesis processing section 32 receives the phoneme data from the receiving section 31 and receives the drama data retrieved from the storage section 33 or the drama data supplied from the server apparatus 10 to link the phoneme data with the drama data, thereby generating a speech waveform, or a synthetic speech. Then, in order to store the synthetic speech into the storage section 33, the text-to-speech synthesis processing section 32 outputs the synthetic speech to the storage section 33 or, in order to sound the synthetic speech, sends it to the loudspeaker 36.

Through the input section 35, the drama data and so on for text-to-speech synthesis are entered. The drama data and so on entered through the input section 35 are stored in the storage section 33 and, when they are to be transmitted to the server apparatus 10, outputted to the transmitting section 39.

The fee-charge processing section 34 generates fee-charge data when the user has purchased phoneme data or a synthetic speech. The fee-charge processing section 34 is connected to a card reader for example in which a prepaid card or the like issued by the administrator of the server apparatus 10 for example is loaded. The card reader performs fee-charge processing on the prepaid card for example. Obviously, the fee-charge processing section 34 may transmit fee-charge data to the server apparatus 10 through the transmitting section 39.

The operating section 38 generates, on the basis of the data displayed on the display section 37, the select data for selecting the phoneme data to be downloaded from the server apparatus 10 and the select data for selecting a synthetic speech speaker, and the select data for selecting a writer of drama data. Also, the operating section 38 is operated by the user for creating drama data for example.

The transmitting section 39 transmits the select data, a download request, and so on entered through the operating section 38 to the server apparatus 10.

Figure 5:
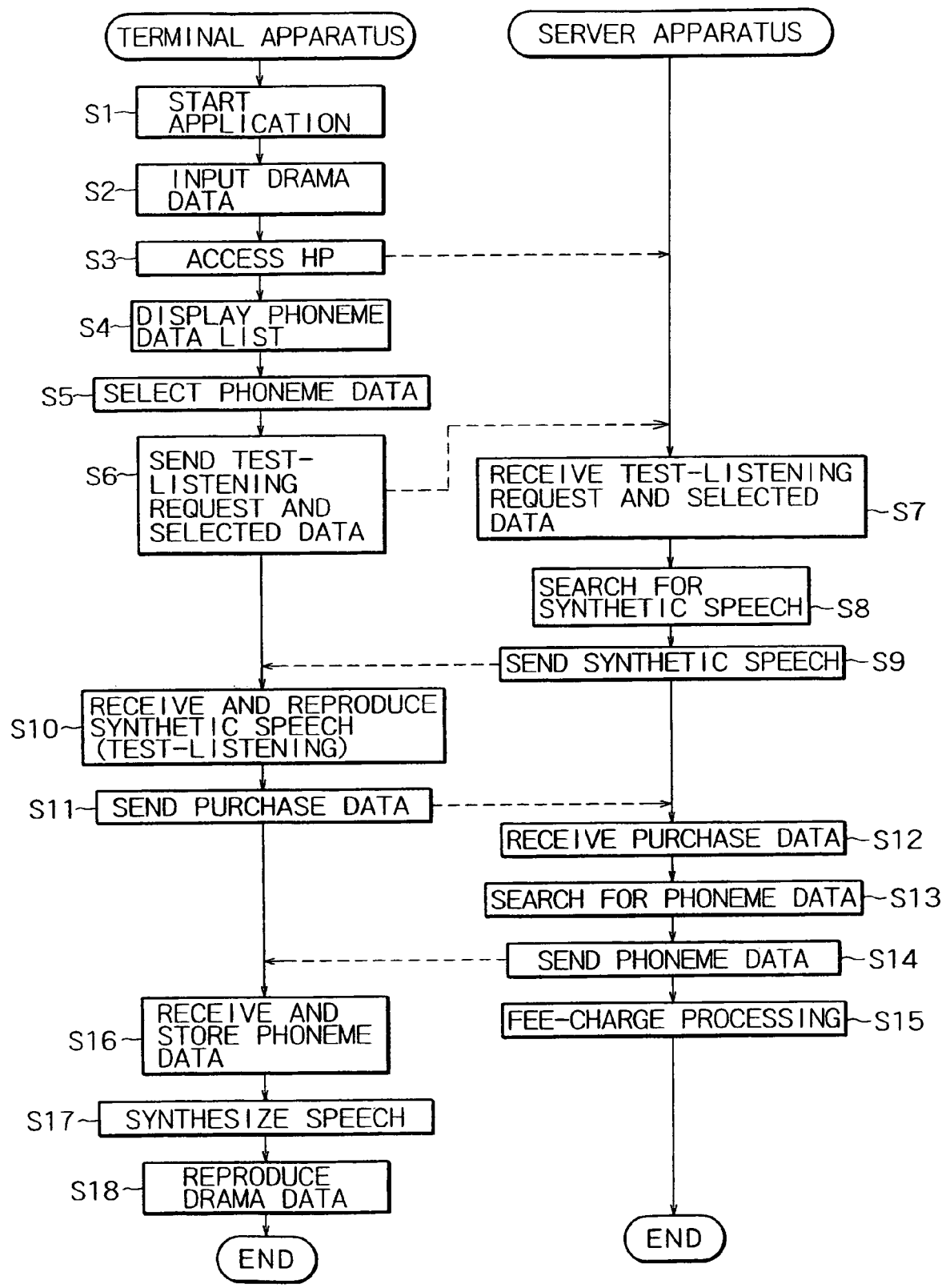
FIG. 5 is a flowchart describing a sequence of procedures for a user to purchase phoneme data.

The following describes a sequence of procedures for the user to purchase phoneme data with reference to FIG. 5.

Figure 6:
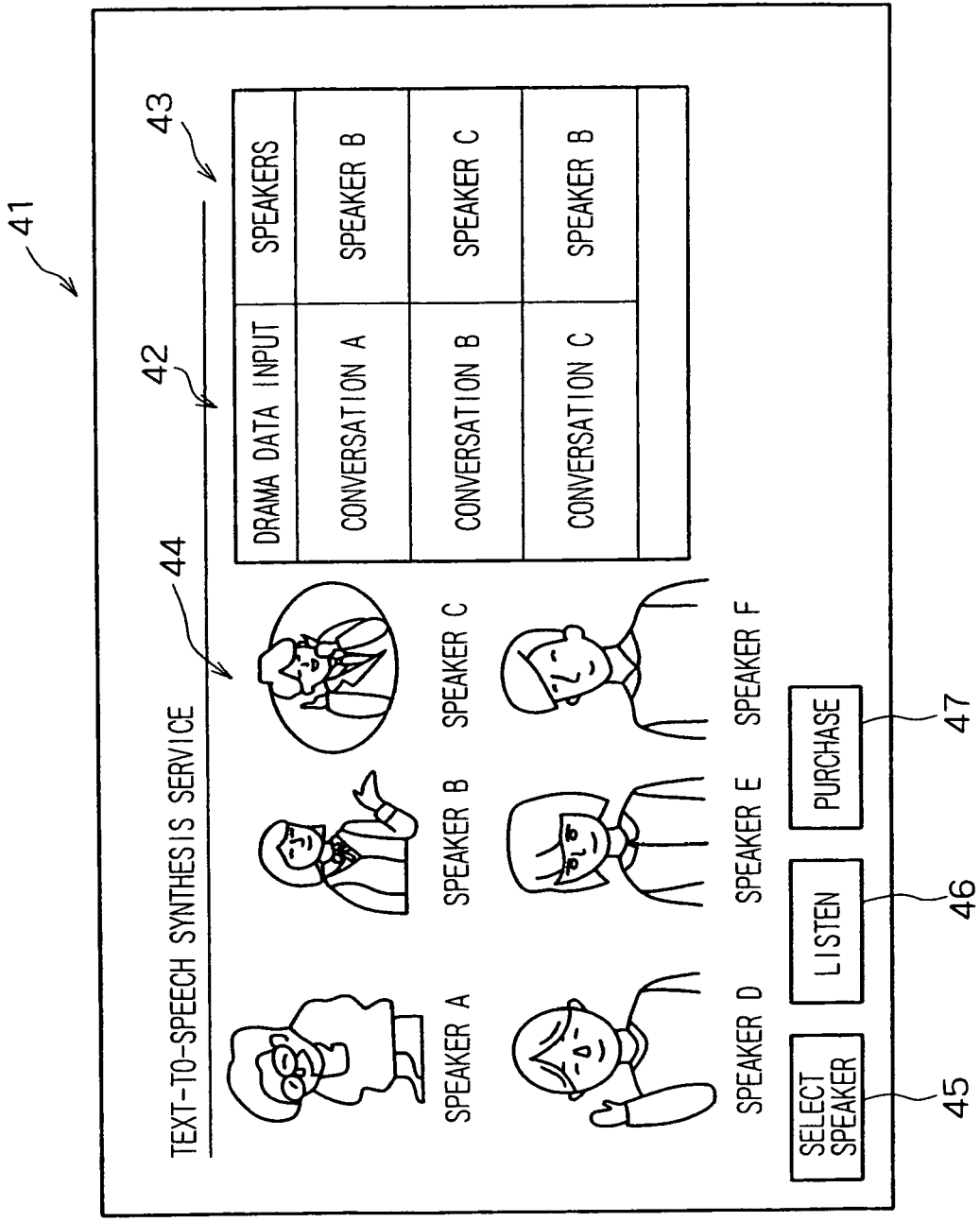
FIG. 6 is a schematic diagram illustrating a screen which is displayed on a display section of the above-mentioned terminal apparatus when the above-mentioned server apparatus is accessed for downloading phoneme data.

In step S1, the terminal apparatus 30 starts an application program for text-to-speech synthesis and displays an operation screen on the display section 37. In step S2, the terminal apparatus 30 reads the drama data entered through the input section 35 or the drama data from the storage section 33. In step S3, the terminal apparatus 30 accesses the home page of the present system located at a predetermined URL (Uniform Resource Location). Then, the server apparatus 10 retrieves the image data constituting the home page from the accumulating section 21 and transmits the retrieved image data to the terminal apparatus 30. Receiving the image data, the terminal apparatus 30 displays a screen as shown in FIG. 6 to the display section 37 in step S4. A screen 41 on the display section 37 has, side by side, a drama display section 42 for displaying conversations A through C for example constituting drama data and a speaker input section 43 for entering speakers who utter conversations A through C. This screen also has a speaker select section 44 displaying speakers A through F of which phoneme data can be downloaded. In addition, the screen 41 has a speaker select button 45 for selecting a speaker, a listen button 46 for test-listening to the synthetic speech of the selected speaker, and a purchase button 47 for purchasing the phoneme data of the selected speaker.

In step S5, the terminal apparatus 30 selects one of the speakers A through C in accordance with the select operation performed by the user with reference to the screen 41 displayed by the user on the display section 37 through the operating section 38. To be specific, on the terminal apparatus 30, the user operates the operating section 38, selects one of the speakers A through F displayed in the speaker select section 44, and clicks the speaker select button 45 to select a desired speaker, thereby determining the phoneme data to be listened or purchased.

When the user who determined a conversion A to C constituting the drama data tries to listen to the synthetic speech of the speaker selected by the user before purchasing the phoneme data clicks the listen button 46 of the screen 41 by operating the operating section 38, the terminal apparatus 30 transmits the user ID, the application serial number, and the select data for identifying the user-selected speaker to the server apparatus 10 in step S6.

In step S7, receiving the user ID, the serial number, and the selected data from the terminal apparatus 30, the server 10 searches, on the basis of the user ID, the user management database constructed in the fourth storage section 18 to perform serial number matching, thereby determining whether or not the test-listening request is from an authorized user. If the accessing user is found an authorized user, the server apparatus 10 goes to step S8; otherwise, the server apparatus 10 sends an error message (not shown) to the terminal apparatus 30. In step S8, on the basis of the selected data, the server apparatus 10 causes the search section 15 to search the synthetic speech constructed in the second storage section 13. Then, in step S9, the server apparatus 10 sends the synthetic speech corresponding to the selected data from the transmitting section 17 to the terminal apparatus 30.

In step S10, receiving the synthetic speech corresponding to the selected data, the terminal apparatus 30 performs predetermined decoding on the received synthetic speech and sounds the decoded synthetic speech from the loudspeaker. Consequently, the user can listen to the speech of the selected speaker.

When purchasing the phoneme data of the selected speaker, the user clicks the purchase button 47 on the screen 41 from the operating section 38, upon which the terminal apparatus 30 sends the purchase data of the selected speaker's phoneme data, the application serial number, and the user ID to the server apparatus 10 in step S11.

In step S12, receiving the user ID and the application serial number from the terminal apparatus 30, the server apparatus 10 searches, on the basis of the received user ID, the user management database constructed in the fourth storage section 18 to perform serial number matching, thereby determining whether or not the test-listening request is from an authorized user. If the accessing user is found an authorized user, the server apparatus 10 goes to step S13; otherwise, the server apparatus 10 sends an error message (not shown) to the terminal apparatus 30.

In step S13, the server apparatus 10 causes the search section 15 to search, on the basis of the purchase data, the phoneme database constructed in the first storage section 12.

In step S14, the server apparatus 10 sends the phoneme data corresponding to the purchase data from the transmitting section 17 to the terminal apparatus 30. In step S15, having sent the phoneme data to the terminal apparatus 30, the server apparatus 10 causes the fee-charge processing section 19 to generate fee-charge data by referencing the fee database constructed in the fifth storage section 20 and stores the generated fee-charge data into the user management database constructed in the fourth storage section 18. Also, the server 10 sends the fee-charge data to the settlement center 3. Also, when a predetermined period has passed, the server 10 may be adapted to sent the fee-charge data to the settlement center 3 on a monthly basis for example.

Figure 7:
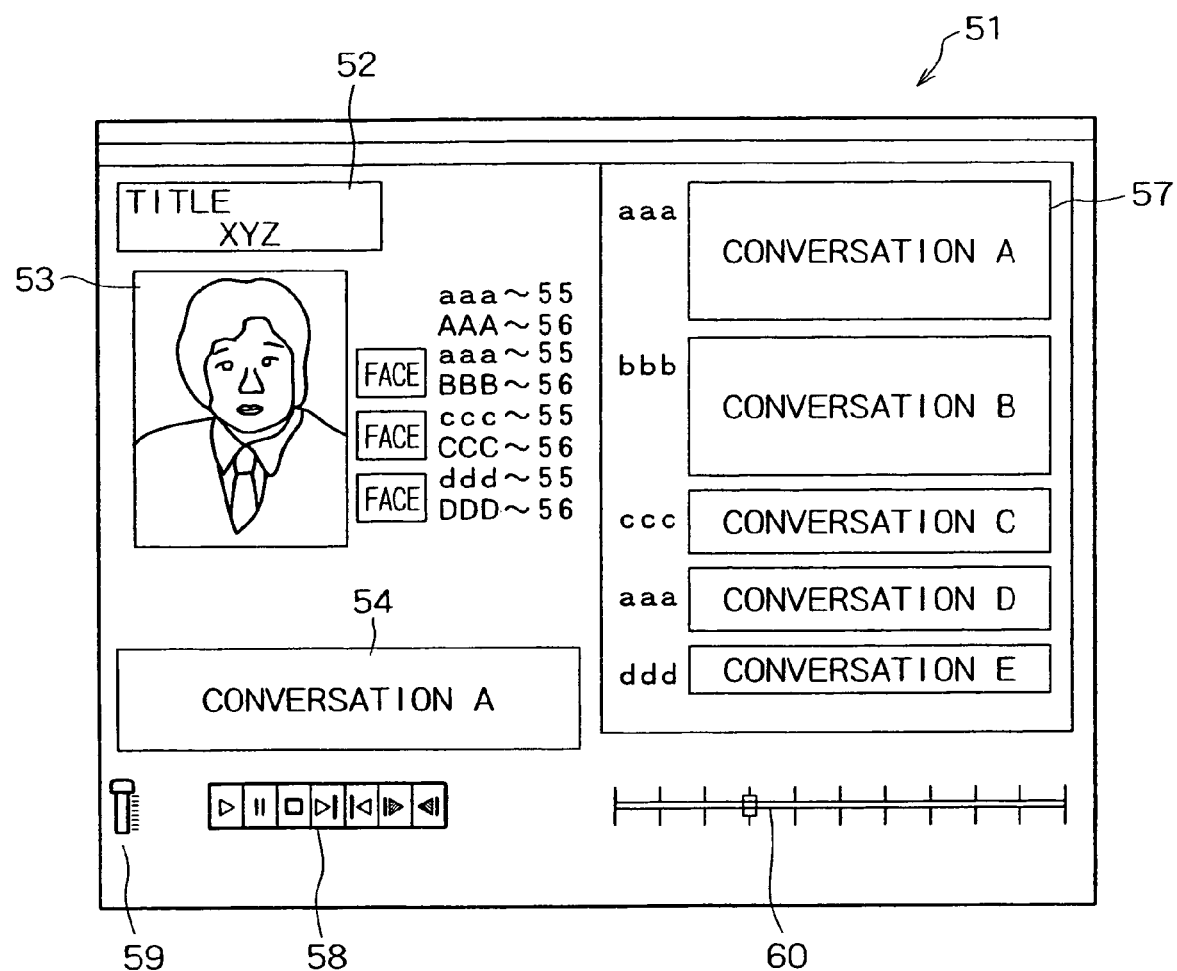
FIG. 7 is a schematic diagram illustrating a screen which is displayed on the display section of the terminal apparatus when drama data are reproduced.

In step S16, receiving the phoneme data corresponding to the phase data at the receiving section 11, the terminal apparatus 30 stores the received phoneme data into the storage section 33. When outputting the drama data in a synthetic speech, the terminal apparatus 30 displays a screen 51 as shown in FIG. 7. The screen 51 has a title display section 52 for displaying the title of drama data, a photograph display section 53 for displaying the photograph of the speaker currently uttering, a speech lines display section 54 for displaying speech lines being uttered, a personage display section 55 for displaying the names of personage in the drama, a speaker display section 56 for displaying speakers to be displayed by photo and name etc., and a drama displaying section 57 for displaying drama. Also, the screen 51 has an operating section 58 for performing drama data reproduction, stop, pause, fast forward, rewind and so on, a sound volume adjusting section 59 for adjusting the sound volume of reproduction, and a reproduction time display section 60 for displaying past reproduction time.

When the reproduction button constituting the operating section 50 in the screen 51 is clicked through the operating section 38, the terminal apparatus 30 performs text-to-speech synthesis processing in accordance with the drama data in the text-to-speech synthesis processing section 32 in step S17. To be specific, the language analyzing section 22 performs language analysis on the drama data retrieved from the third storage section 14 on the basis of the contents of the word dictionary database 26 and the grammar rule database 27. Then, the speech symbol generating section 23 generates a sequence of speech symbols on the basis of the contents of the generation rule database 28. The text-to-speech synthesizing section 24 extracts the phoneme data from the first storage section 12 and links the phoneme data in accordance with the sequence of speech symbols. It should be noted that this processing in the time series of the speech lines in the order of conversation A through conversation E shown in FIG. 7. Consequently, the drama data of the user are sounded from the loudspeaker 36 in step S18. Because the currently reproduced speech lines are displayed on the speech lines display section 54 and the photograph of the uttering speaker is displayed on the photograph display section 53, the user can easily know which speaker is currently reciting which speech lines in the drama displayed on the drama display section 57. In addition, by performing operations through the operating section 58 such as pause, fast forward, rewind, and so on, the user can listen the recitation of the selected drama as desired. Thus, the user can readily make the user-written drama for example be recited by a user-selected speaker. In addition, because the user has purchased the phoneme data, the user can generate a synthetic speech on the basis of other drama data by the terminal apparatus 30 after the phoneme data purchase.

In the above-mentioned example, the fee-charge processing is executed by the server apparatus 10. It will be apparent that the fee-charge processing may alternatively be executed by the terminal apparatus 30. In this case, the server apparatus 10 sends the fee-charge data along with the phoneme data to the terminal apparatus 30, which performs diminution processing on the prepaid card connected to the fee-charge processing section in accordance with these fee-charge data.

Figure 8:
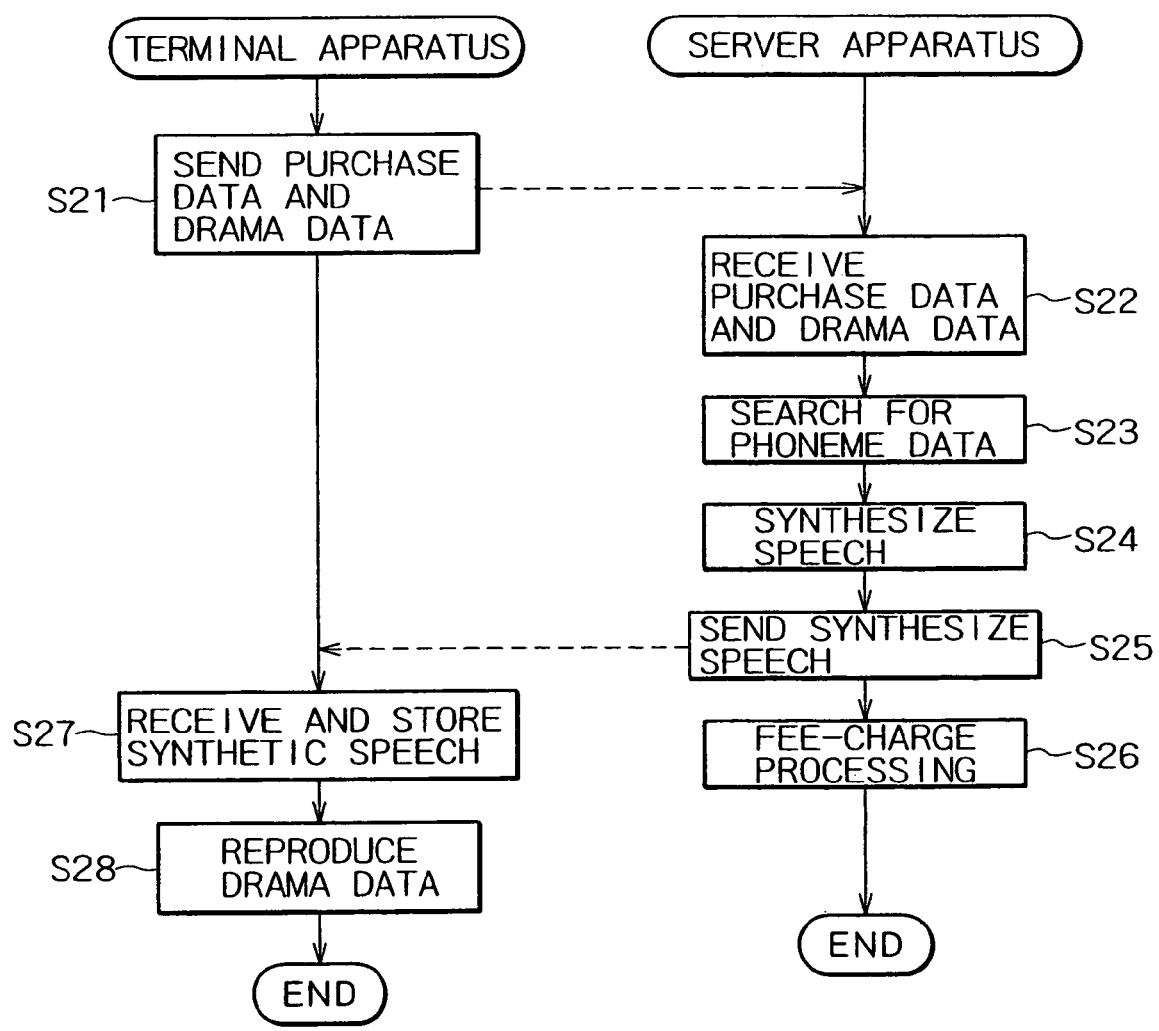
FIG. 8 is a flowchart describing an example in which fee-charge processing is executed by the terminal apparatus when phoneme data are purchased.

In the above-mentioned example, the terminal apparatus 30 downloads phoneme data from the server apparatus 10 to perform text-to-speech synthesis processing. It will be apparent that the server apparatus 10 may alternatively perform this text-to-speech synthesis processing as shown in FIG. 8.

To be more specific, after test-listening to the synthetic speech of the speaker shown in FIG. 5 for example, the terminal apparatus 30 sends the purchase data of the speaker's phoneme data, the drama data, the application serial number, and the user ID to the server apparatus 10.

In step S22, receiving the purchase data of the phoneme data of the selected speaker, the drama data, the application serial number, and the user ID from the terminal apparatus 30, the server apparatus 10 searches, on the basis of the user ID, the user management database constructed in the fourth storage section 18 to perform serial number matching, thereby determining whether or not the test-listening request is from an authorized user. If the accessing user is found an authorized user, then the server apparatus 10 goes to step S23; otherwise, the server apparatus 10 sends an error message (not shown) to the terminal apparatus 30.

In step S23, the server apparatus 10 causes the search section 15 to search, on the basis of the purchase data, the phoneme database constructed in the first storage section 12. Then, in step S24, the text-to-speech synthesis processing section 16 links the retrieved phoneme data on the basis of the drama data supplied from the terminal apparatus 30 to perform text-to-speech synthesis processing. To be more specific, when the drama data supplied from the terminal apparatus 30 are entered, the language analyzing section 22 performs language analysis on the entered drama data on the basis of the contents of the word dictionary database 26 and the grammar rule database 27. Next, the speech symbol generating section 23 generates a sequence of speech symbols on the basis of the contents of the generation rule database 28. The text-to-speech synthesizing section 24 extracts the phoneme data of the speaker retrieved by the search section 15 from the phoneme database constructed in the first storage section 12 and links the extracted phoneme data in accordance with the generated sequence of speech symbols. In step S25, the server apparatus 10 sends the synthetic speech corresponding to the purchase data to the terminal apparatus 30 through the transmitting section 17. In step S26, the server apparatus 10, upon sending of the synthetic speech to the terminal apparatus 30, causes the fee-charge processing section 19 to generate fee-charge data by referencing the fee database in the fifth storage section 20, storing the generated fee-charge data into the user management database constructed in the fourth storage section 18. Then, the server apparatus 10 sends the fee-charge data to the settlement center 3. Also, when a predetermined period has passed, the server 10 may be adapted to send the fee-charge data to the settlement center 3 on a monthly basis for example.

In step S27, receiving the synthetic speech corresponding to the purchase data at the receiving section 11, the terminal apparatus 30 stores the received synthetic speech into the storage section 33. In step S28, when a reproduction operation is performed through the operating section 38, the terminal apparatus 30 sounds the synthetic speech from the loudspeaker 36. Thus, the user can readily make the user-written drama for example be recited by a user-selected speaker.

Also, in the above-mentioned example, the fee-charge processing is executed by the server apparatus 10. It will be apparent that the fee-charge processing may alternatively be executed by the terminal apparatus 30. In this case, the server apparatus 10 sends the fee-charge data along with the phoneme data to the terminal apparatus 30, which performs diminution processing on the prepaid card connected to the fee-charge processing section in accordance with these fee-charge data.

It should be noted that the present system may also be configured so that the user sends drama data to the server apparatus 10 and synthetic speeches generated by the server apparatus 10 by performing text-to-speech synthesis processing on the received drama data are sold to other users.

Figure 9:
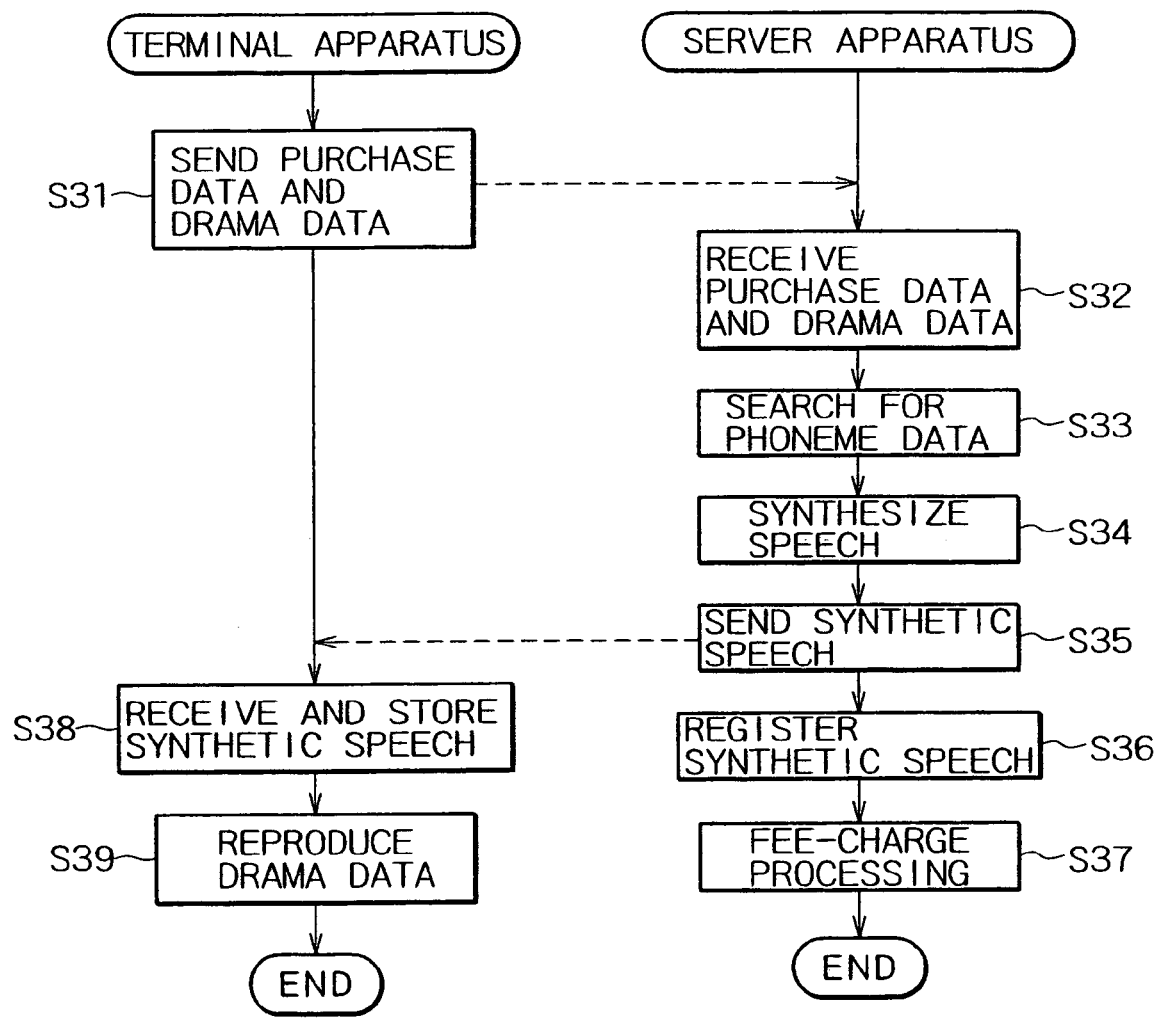
FIG. 9 is a flowchart describing a sequence of procedures for a user to purchase phoneme data.

To be more specific, after test-listening of the synthetic speech of the speaker shown in FIG. 5, the terminal apparatus 30 sends the purchase data of the phoneme data of the speaker, the drama data, the application serial number, and the user ID to the server apparatus 10 in step S31 as shown in FIG. 9.

In step S32, receiving the purchase data of the phoneme data of the speaker, the drama data, the application serial number, and the user ID from the terminal apparatus 30, the server apparatus 10 searches, on the basis of the user ID, the user management database constructed in the fourth storage section 18, thereby determining whether or not the test-listening request is from an authorized user. If the accessing user is found an authorized user, the server apparatus 10 goes to step S33; otherwise, the server apparatus 10 sends an error message (not shown) to the terminal apparatus 30.

In step S33, the server apparatus 10 causes the search section 15 to search, on the basis of the purchase data, the phoneme database constructed in the first storage section 12. In step S34, the server apparatus 10 causes the text-to-speech synthesis processing section 16 to link the retrieved phoneme data on the basis of the drama data supplied from the terminal apparatus 30 to perform text-to-speech synthesis processing. To be more specific, when the drama data supplied from the search section 15 from the terminal apparatus 30 are entered, the language analyzing section 22 performs language analysis on the entered drama data on the basis of the contents of the word dictionary database 26 and the grammar rule database 27. Next, the speech symbol generating section 23 generates a sequence of speech symbols on the basis of the contents of the generation rule database 28. The text-to-speech synthesizing section 24 extracts the phoneme data of the speaker retrieved by the search section 15 from the phoneme database constructed in the first storage section 12 and links the extracted phoneme data in accordance with the generated sequence of speech symbols.

In step S35, the server apparatus 10 sends the synthetic speech corresponding to the purchase data to the terminal apparatus 30 through the transmitting section 17.

In step S36, the text-to-speech synthesis processing section 16 registers the generated synthetic speech into the synthetic speech database constructed in the second storage section 13. Consequently, the server apparatus 10 allows other users to purchase this synthetic speech. In step S37, the server apparatus 10, upon sending of the synthetic speech to the terminal apparatus 30, causes the fee-charge processing section 19 to generate fee-charge data by referencing the fee database in the fifth storage section 20, storing the generated fee-charge data into the user management database constructed in the fourth storage section 18. Then, the server apparatus 10 sends the fee-charge data to the settlement center 3. Also, when a predetermined period has passed, the server 10 may be adapted to sent the fee-charge data to the settlement center 3 on a monthly basis for example.

In step S38, receiving the synthetic speech corresponding to the purchase data at the receiving section 11, the terminal apparatus 30 stores the received synthetic data into the storage section 33. In step S39, when a reproduction operation is performed through the operating section 38, the terminal apparatus 30 sounds the synthetic speech from the loudspeaker 36. Thus, the user can readily make the user-written drama for example be recited by a user-selected speaker.

Figure 10:
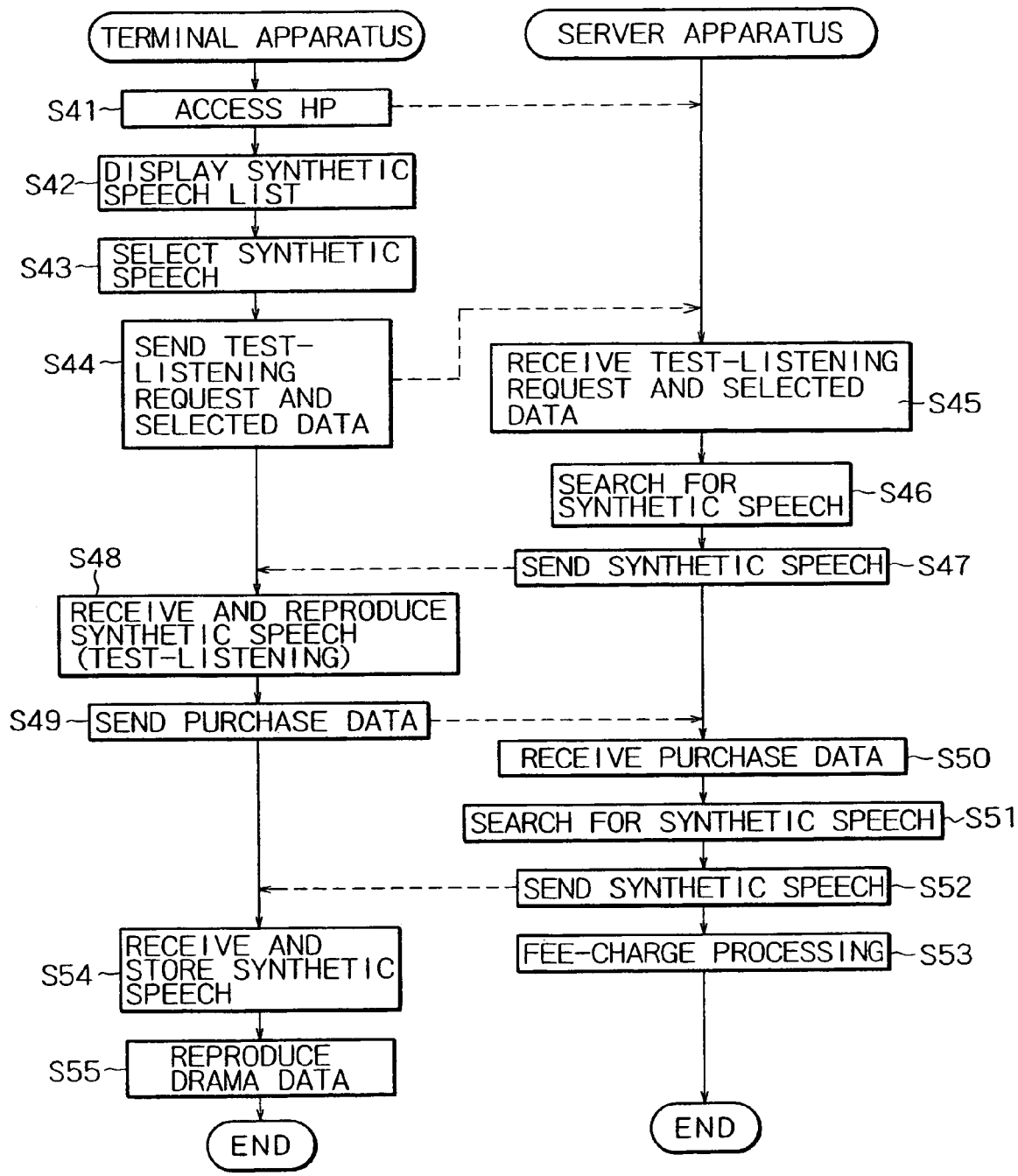
FIG. 10 is a flowchart describing a sequence or procedure for a user to purchase synthetic speech.

According to the above-mentioned sequence of procedures, the server apparatus 10 registers the synthetic speeches generated on the basis of the drama data supplied from the terminal apparatus 30 into the synthetic speech database in the second storage section 13, thereby allowing other users to purchase these synthetic speeches at other terminal apparatuses 30. The following describes a procedure for a user to purchase these synthetic speeches from any one of the other terminal apparatuses 30 with reference to FIG. 10.

Figure 11:
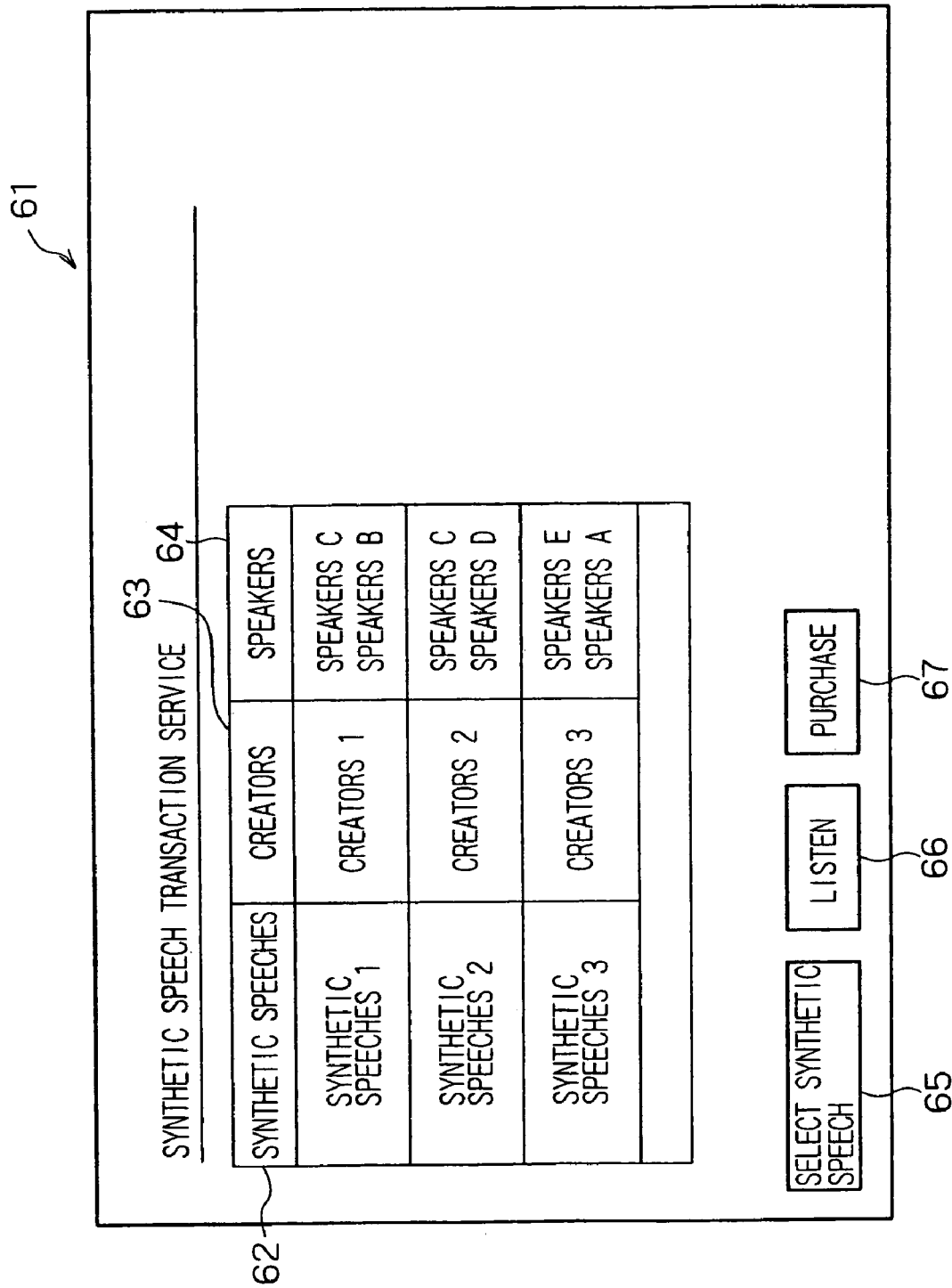
FIG. 11 is a schematic diagram illustrating a screen which is displayed on the display section of the terminal apparatus when the server apparatus is accessed for purchasing synthetic speech.

In step S41, the terminal apparatus 30 accesses the home page of the present system 1 located at a predetermined URL. Then, the server apparatus 10 retrieves the image data constituting the home page and sends the retrieved image data to the terminal apparatus 30. In step S42, the terminal apparatus 30 displays a screen as shown in FIG. 11 on the display section 37. A screen 61 displayed on the display section 37 has a synthetic speech display section 62 for displaying identification data for identifying purchasable synthetic speeches (synthetic speeches 1 through 3), a creator display section 63 for displaying the names of creators of the synthetic speeches displayed on the synthetic speech display section 62 (creators 1 through 3), and a speaker display section 64 for displaying the speakers of these synthetic speeches (speakers A through E). Also, the screen 61 has a synthetic speech select button 65 for selecting a synthetic speech, a listen button 66 for test-listening to the selected synthetic speech, and a purchase button 67 for purchasing the selected synthetic speech.

In step S43, on the terminal apparatus 30, by referencing the screen 61 displayed on the display section 37, the user selects one of the synthetic speeches 1 through 3 from the operating section 38 by clicking the synthetic speech select button 65, thereby determining the synthetic speech to be listened or purchased.

When selecting a synthetic speech from the synthetic speech display section 62 through the operating section 38 to listen to the selected synthetic speech before purchase, the user clicks the listen button 46 on the screen 41 through the operating section 38, upon which the terminal apparatus 30 sends the user ID, the application serial number, and the select data for identifying the user-selected synthetic speech to the server apparatus 10 in step S44.

In step S45, receiving the user ID, the application serial number, and the select data from the terminal apparatus 30, the server apparatus 10 searches, on the basis of the user ID, the user management database constructed in the fourth storage section 18 to perform serial number matching, thereby determining whether or not the test-listening request is from an authorized user. If the accessing user is found an authorized user, the server apparatus 10 goes to step S46; otherwise, the server apparatus 10 sends an error message (not shown) to the terminal apparatus 30. In step S46, the server apparatus 10 causes the search section 15 to search, on the basis of the select data, the synthetic speech database constructed in the second storage section 13. In step S47, the server apparatus 10 sends the synthetic speech corresponding to the select data to the terminal apparatus 30 through the transmitting section 17.

In step S48, receiving the synthetic speech corresponding to the select data, the terminal apparatus 30 performs predetermined decoding on the received synthetic speech and sounds the decoded synthetic speech from the loudspeaker 36. Thus, the user can listen to the selected synthetic speech.

When the user clicks the purchase button 67 on the screen 41 through the operating section 38 to purchase the selected synthetic speech, the terminal apparatus 30 sends the purchase data of the synthetic speech, the application serial number, and the user ID to the server apparatus 10 in step S49.

In step S50, receiving the user ID, the serial number, and the purchase data from the terminal apparatus 30, the server apparatus 10 searches, on the basis of the user ID, the user management database constructed in the fourth storage section 18 to perform serial number matching, thereby determining whether or not the test-listening request is from an authorized user. If the accessing user is found an authorized user, the server apparatus 10 goes to step S51; otherwise, the server apparatus 10 sends an error message (not shown) to the terminal apparatus 30.

In step S51, the server apparatus 10 causes the search section 15 to search, on the basis of the purchase data, the synthetic speech database constructed in the second storage section 13. In step S52, the server apparatus 10 sends the synthetic speech corresponding to the purchase data to the terminal apparatus 30 through the transmitting section 17. In step S53, the server apparatus 10, upon sending of the synthetic speech to the terminal apparatus 30, causes the fee-charge processing section 19 to generate fee-charge data by referencing the fee database in the fifth storage section 20, storing the generated fee-charge data into the user management database constructed in the fourth storage section 18. Then, the server apparatus 10 sends the fee-charge data to the settlement center 3. Also, when a predetermined period has passed, the server 10 may be adapted to sent the fee-charge data to the settlement center 3 on a monthly basis, for example.

In step S54, receiving the synthetic speech corresponding to the purchase data at the receiving section 11, the terminal apparatus 30 stores the received synthetic data into the storage section 33. In step S39, when a reproduction operation is performed through the operating section 38, the terminal apparatus 30 sounds the synthetic speech from the loudspeaker 36. Thus, the user can readily make the user-written drama for example be recited by a user-selected speaker.

Also, in the above-mentioned example, the fee-charge processing is executed by the server apparatus 10. It will be apparent that the fee-charge processing may alternatively be executed by the terminal apparatus 30. In this case, the server apparatus 10 sends the fee-charge data along with the phoneme data to the terminal apparatus 30, which performs diminution processing on the prepaid card connected to the fee-charge processing section in accordance with these fee-charge data.

In the above-mentioned example, drama data are sent from the terminal apparatus 30 to the server apparatus 10 to generate a synthetic speech on the basis of the drama data. The present system 1 may alternatively configured so that drama data are selected through a home page. The following describes this example of selecting drama speeches through a home page, with reference to FIG. 12.

Figure 13:
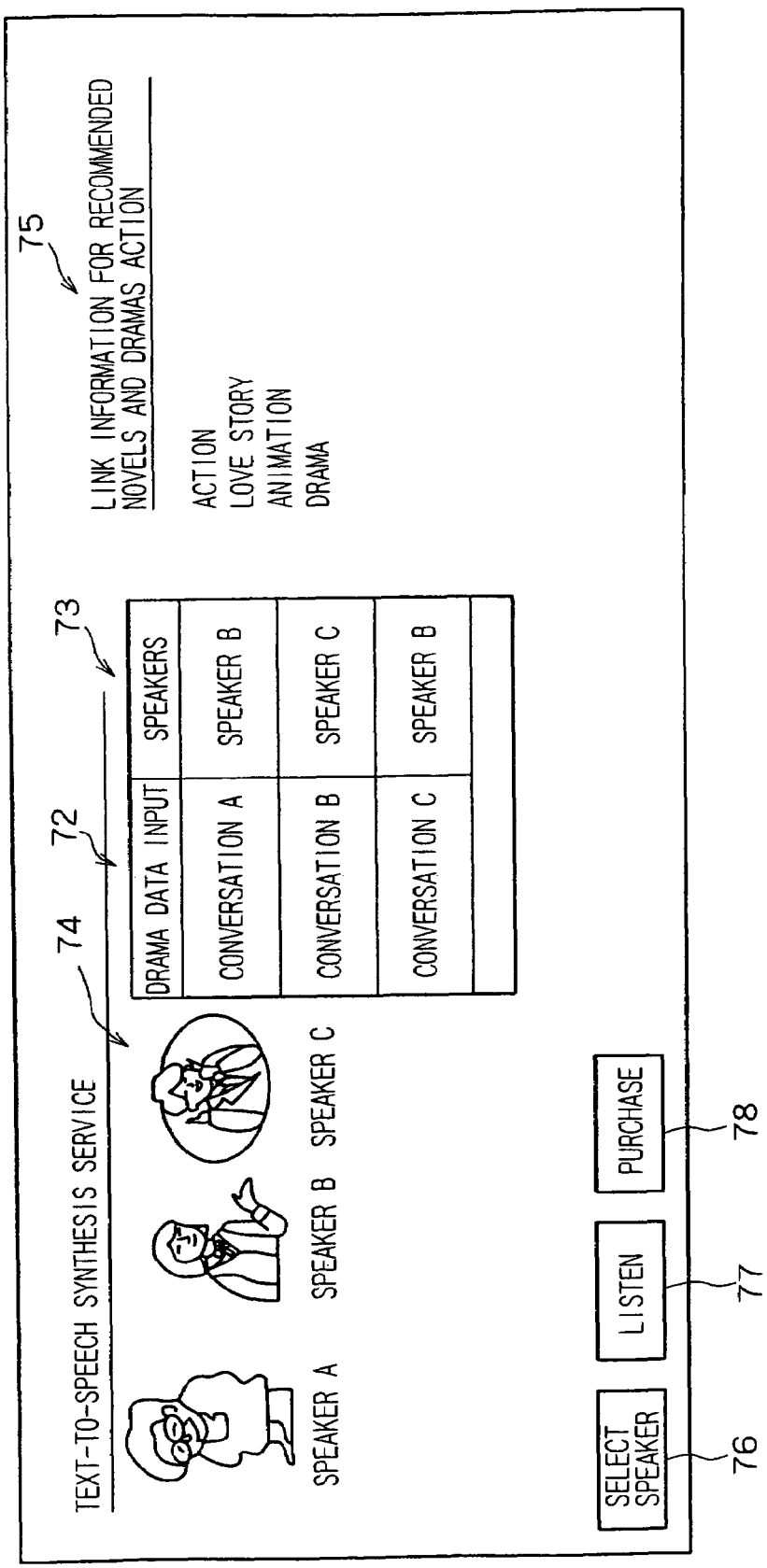
FIG. 13 is a schematic diagram illustrating a screen which is displayed when the user selects drama data and a speaker on the home page to purchase phoneme data.

In step S61, the terminal apparatus 30 accesses the home page of this system 1 located at a predetermined URL. Then, the server apparatus 10 retrieves the image data constituting the home page from the accumulating section 21 and sends the retrieved image data to the terminal apparatus 30. Receiving the image data, the terminal apparatus 30 displays a screen on the display section 37 as shown in FIG. 13 in step S62. A screen 71 displayed on the display section 37 has, side by side, a drama display section 72 for displaying conversations A through C for example constituting the drama data and a speaker input section 73 for entering a speaker who utters a conversion A to C. This screen also has a speaker select section 75 displaying speakers A through C whose phoneme data can be downloaded. In addition, the screen 71 has a speaker select button 76 for selecting one of the speakers, a listen button 77 for test-listening to the synthetic speech of the selected speaker, and a purchase button 78 for purchasing the phoneme data of the selected speaker.

In step S63, the terminal apparatus 30 selects drama data. To be more specific, the drama select section 75 is divided into genres such as action, love story, animation, drama, and so on. When the user clicks a desired genre through the operating section 38, the drama title of the specified genre is displayed. On the terminal apparatus 30, when the specified drama is selected through the operating section 38, sends the select data of the drama to the server apparatus 10 in step S64. In step S65, receiving the select data, the server apparatus 10 causes the search section 15 to search the drama database constructed in the third storage section 14 in step S66. In step S67, the server apparatus 10 sends the retrieved drama data to the terminal apparatus 30.

In step S68, receiving the drama data from the server apparatus 10, the terminal apparatus 30 displays the conversation (here, A to C) constituting the selected drama on the drama display section 72. Consequently, the user can select the speaker suitable for the drama.

In step S69, on the terminal apparatus 30, the user sequentially selects the speakers A through C displayed on the speaker select section 74 of the conversations A through C displayed on the drama display section 72 through the operating section 38 and clicks the speaker select button 76 to determine the phoneme data to be listened or purchased.

When test-listening to the selected synthetic speech before purchase, the user clicks the listen button 77 on the screen 71 through the operating section 38, the terminal apparatus 30 sends the user ID, the application serial number, and the select data for identifying the user-selected synthetic speech to the server apparatus 10 in step S70.

In step S71, receiving the user ID, the serial number, and the select data, the server apparatus 10 searches, on the basis of the user ID, the user management database constructed in the fourth storage section 18 to perform serial number matching, thereby determining whether or not the test-listening request is from an authorized user. If the accessing user is found an authorized user, then the server apparatus 10 goes to step S72; otherwise, the server apparatus 10 sends an error message (not shown) to the terminal apparatus 30.

In step S72, the server apparatus 10 causes the search section 15 to search, on the basis of the select data, the synthetic speech database constructed in the second storage section 13. In step S73, the server apparatus 10 sends the synthetic speech corresponding to the select data to the terminal apparatus 30 through the transmitting section 17.

In step S74, receiving the synthetic speech according to the select data at the receiving section 31, the terminal apparatus 30 performs predetermined decoding on the received synthetic speech and sounds the decoded synthetic speech from the loudspeaker 36. Consequently, the user can listen to the selected synthetic speech. The synthetic speech here is not based on the drama data selected by the user but is for the purpose of sampling. The present system may also be configured so that the server apparatus 10 generates a synthetic speech corresponding to the user-selected drama data and sends the generated synthetic speech to other terminal apparatuses 30. This allows the user to better grasp an image in which the selected speaker is made recite the user-selected drama.

When the user clicks the purchase button 78 on the screen 71 through the operating section 38 to purchase the phoneme data of the selected speaker, the terminal apparatus 30 sends the select data of the phoneme data of this speaker, the application serial number, and the user ID to the server apparatus 10 in step S75.

In step S76, receiving the user ID, the serial number, and the purchase data from the terminal apparatus 30, the server apparatus 10 searches on the basis of the user ID the user management database constructed in the fourth storage section 18 to perform serial number matching, thereby determining whether or not the test-listening request is from an authorized user. If the accessing user is found an authorized user, the server apparatus 10 goes to step S77; otherwise, the server apparatus 10 sends an error message to the terminal apparatus 30.

In step S77, the server apparatus 10 causes the search section 15 to search, on the basis of the speaker select data, the phoneme database constructed in the first storage section 12. In step S78, the server apparatus 10 sends the phoneme data corresponding to the purchase data to the terminal apparatus 30 through the transmitting section 17. In step S79, the server apparatus 10, upon sending of the synthetic speech to the terminal apparatus 30, causes the fee-charge processing section 19 to generate fee-charge data by referencing the fee database in the fifth storage section 20, storing the generated fee-charge data into the user management database constructed in the fourth storage section 18. Then, the server apparatus 10 sends the fee-charge data to the settlement center 3. Also, when a predetermined period has passed, the server 10 may be adapted to send the fee-charge data to the settlement center 3 on a monthly basis, for example. It should be noted that this fee-charge processing may also be performed on the drama data, in addition to the phoneme data.

In step S80, receiving the phoneme data according to the purchase data at the receiving section 11, the terminal apparatus 30 stores the received phoneme data in the storage section 33. When the user performs a reproduction operation through the operating section 38 to output the drama data in a synthetic speech, the terminal apparatus 30 generates the synthetic speech corresponding to the drama data selected by the user through the home page in step S81. To be more specific, the language analyzing section 22 performs language analysis on the drama data downloaded from the home page on the basis of the contents of the word dictionary database 26 and the grammar rule database 27. Next, the speech symbol generating section 23 generates a sequence of speech symbols on the basis of the contents of the generation rule database 28. The text-to-speech synthesizing section 24 extracts the phoneme data of the speaker from the first storage section 12 and links the extracted phoneme data in accordance with the generated sequence of speech symbols. It should be noted that this processing in the time series of the speech lines in the order of conversation A through conversation E shown in FIG. 11. Consequently, the user's drama data are outputted from the loudspeaker 36 in step S82. Thus, the user can readily make the user-written drama for example be recited by a user-selected speaker.

Also, in the above-mentioned example, the fee-charge processing is performed by the server apparatus 10. It will be apparent that the fee-charge processing is alternatively performed by the terminal apparatus 30. In this case, the server apparatus 10 sends the fee-charge data along with the phoneme data to the terminal apparatus 30, which performs diminution processing on the prepaid card connected to the fee-charge processing section in accordance with these fee-charge data. In the above-mentioned example, the terminal apparatus 30 downloads the phoneme data from the server apparatus 10 and the terminal apparatus 30 performs text-to-speech synthesis processing. It will be apparent that this text-to-speech synthesis processing may alternatively performed by the server apparatus 10 as shown in FIG. 8.

The system 1 may also be configured so that, when the user accesses the server apparatus 10 from the terminal apparatus 30 to purchase desired phoneme data, the user can listen to the synthetic speech of the speaker whose phoneme data have already been purchased by another user.

Figure 14:
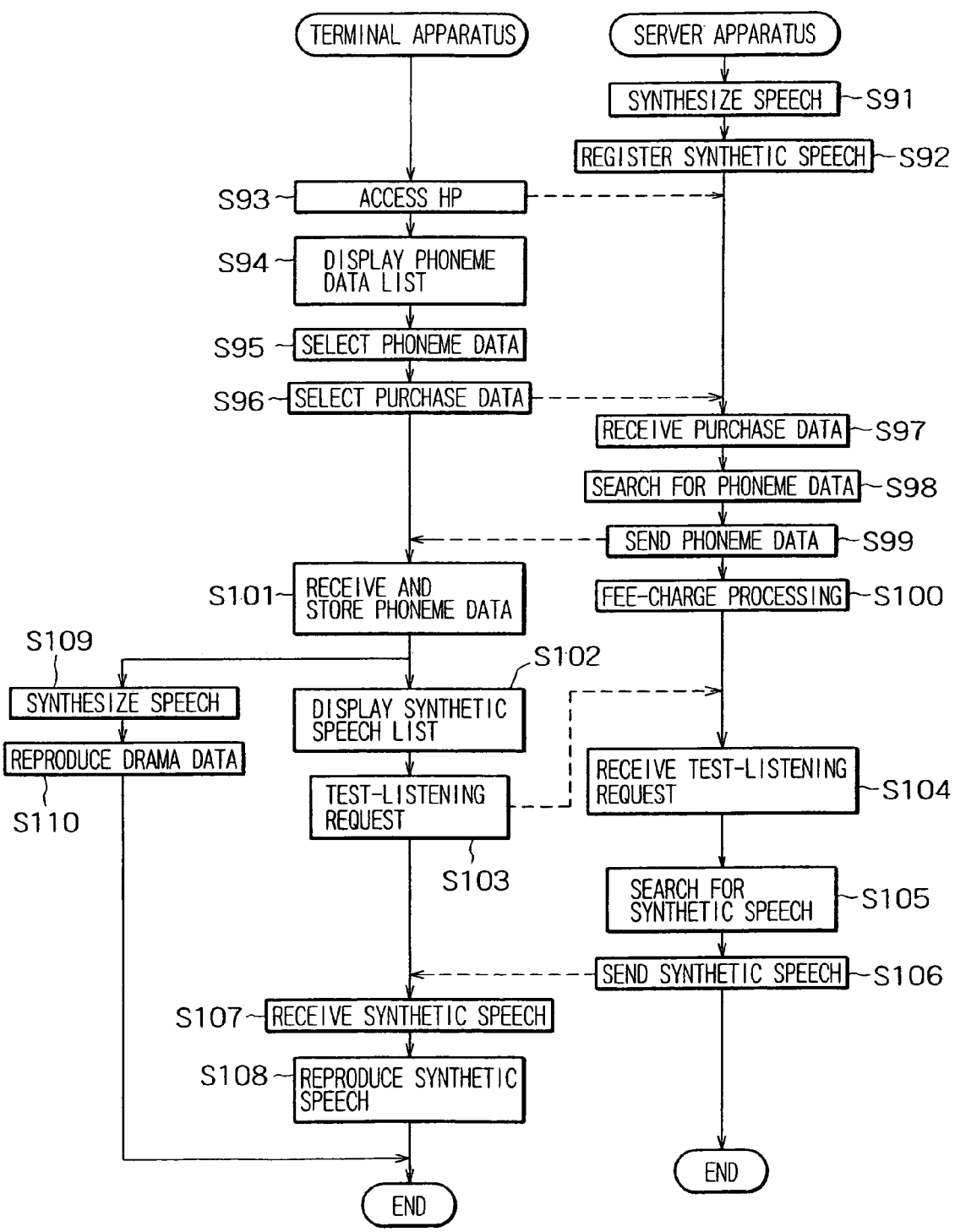
FIG. 14 is a flowchart describing a procedure for test-listening to the synthetic speech of a speaker of the phoneme data already purchased by another user when the user has accessed from the terminal apparatus to the server apparatus to purchase desired phoneme data.

The above-mentioned configuration is described with reference to FIG. 14.

First, in step S91, the server apparatus 10 performs text-to-speech synthesis processing in response to a request from the terminal apparatus 30. In step S82, the server apparatus 10 registers the generated synthetic speech into the synthetic speech database constructed in the second storage section 13.

To be more specific, as shown in step S31 of FIG. 9, the terminal apparatus 30 sends the select data of the phoneme data of a speaker to be purchased and the drama data to the server apparatus 10. The server apparatus 10 generates a synthetic speech by following the procedures of steps S32 through S36 and registers the generated synthetic speech into the synthetic speech database constructed in the second storage section 13. As shown in the steps subsequent to step S76 of FIG. 12, the server apparatus 10 extracts user-specified drama data from the drama database constructed in the first storage section 12 and user-specified phoneme data from the phoneme database constructed in the first storage section 12 and links the specified phoneme data on the basis of the specified drama data, thereby generating a synthetic speech. The server apparatus 10 registers the generated synthetic speech into the synthetic speech database constructed in the second storage section 13.

Figure 15:
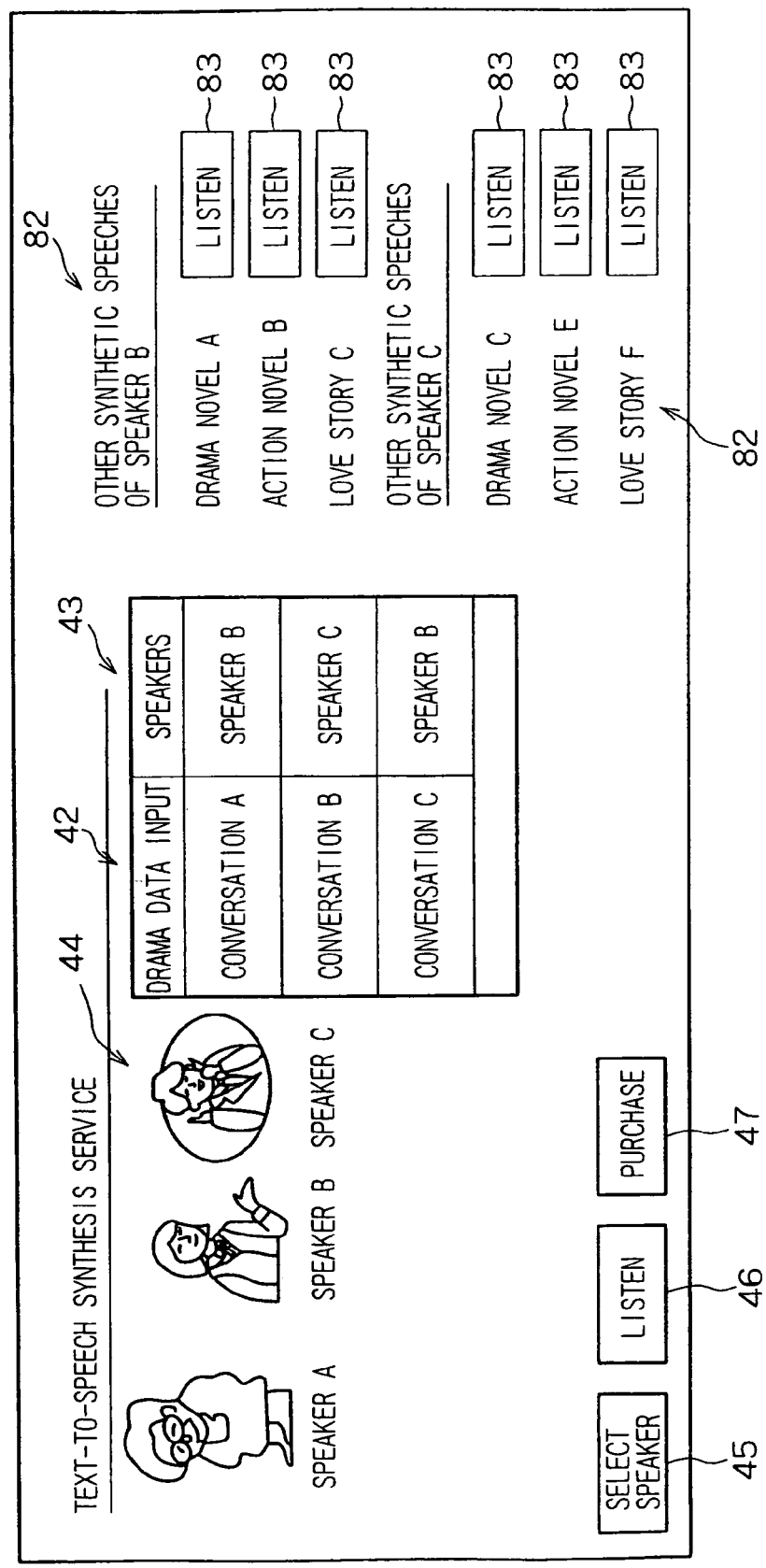
FIG. 15 is a schematic diagram illustrating a screen which is displayed on the display section of the terminal apparatus when test-listening to the synthetic speech generated by use of the phoneme data purchased by another user.

In step S93, the terminal apparatus 30 accesses the home page of the present system 1 located at a predetermined URL. In step S94, the terminal apparatus 30 displays a screen as shown in FIG. 15 onto the display section 37. In step S95, in accordance with the a selection operation performed by the user through the operating section 38 while referencing the screen 41 displayed on the display section 37, the terminal apparatus 30 selects the speaker of one of conversations A through C. When the user clicks the speaker select button 45 in the speaker select section 44 through the operating section 38 after determining the speaker of one of conversations A through C in the drama display section 42 from among the speakers A through F in the speaker select section 44, the terminal apparatus 30 determines the phoneme data to be listened or purchased.

When the user, who determined one of the conversations A through C constituting the drama data clicks the listen button 46 on the screen 41 through the operating section 38 to listen to the synthetic speech of the selected speaker before purchasing the phoneme data, the terminal apparatus 30 sends the user ID, the application serial number, and the select data for identifying the user-selected speaker to the server apparatus 10 in step S96.

In step S97, receiving the user ID, the serial number, and the select data from the terminal apparatus 30, the server apparatus 10 searches, on the basis of the user ID, the user management data base constructed in the fourth storage section 18 to perform serial number matching, thereby determining whether or not the test-listening request is from an authorized user. If the accessing user is found an authorized user, then the server apparatus 10 goes to step S98; otherwise, the server apparatus 10 sends an error message (not shown) to the terminal apparatus 30. In step S98, the server apparatus 10 causes the search section 15 to search, on the basis of the select data, the phoneme database constructed in the second storage section 13. In step S99, the server apparatus 10 sends the phoneme data corresponding to the select data to the terminal apparatus 30 through the transmitting section 17.

Figure 12:
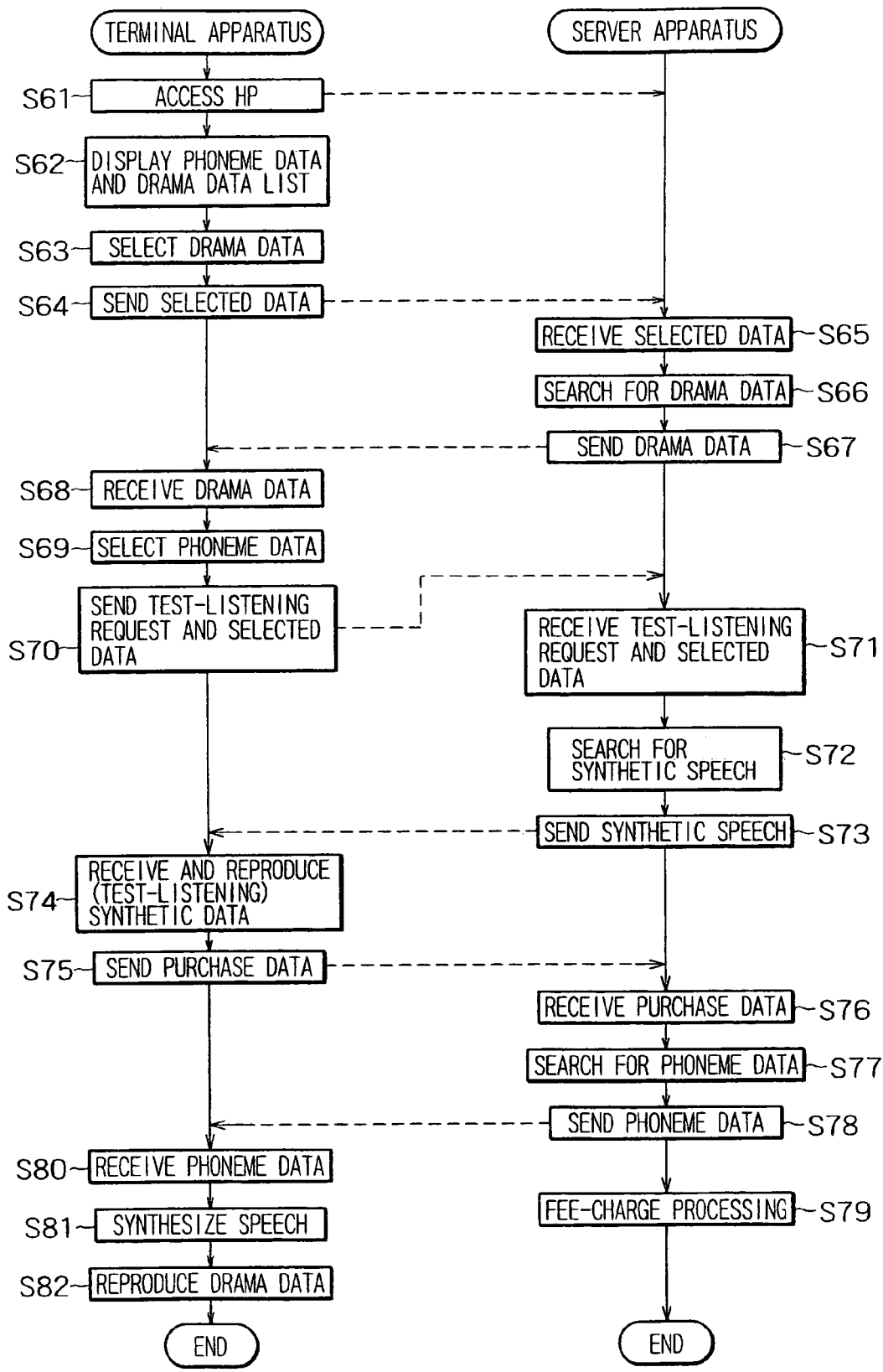
FIG. 12 is a flowchart describing a sequence or procedures for a user to select drama data and a speaker on a home page to purchase phoneme data.

It should be noted that, as shown in FIG. 8, the server apparatus 10 may be configured so that the server apparatus 10 receives drama data from the terminal apparatus 30 in addition to the select data of phoneme data of a speaker, generates a synthetic speech corresponding to the received drama data, and sends the generated synthetic speech to the terminal apparatus 30 along with the phoneme data. Alternatively, as shown in FIG. 12, the server apparatus 10 may be configured so that generates a synthetic speech on the basis of the drama data made public through the home page and selected by the user and sends the generated synthetic speech to the terminal apparatus 30 along with the phoneme data.

In step S100, the server apparatus 10, upon sending of the phoneme data to the terminal apparatus 30, causes the fee-charge processing section 19 to generate fee-charge data by referencing the fee database in the fifth storage section 20, storing the generated fee-charge data into the user management database constructed in the fourth storage section 18. Then, the server apparatus 10 sends the fee-charge data to the settlement center 3. Also, when a predetermined period has passed, the server 10 may be adapted to send the fee-charge data to the settlement center 3 on a monthly basis, for example.

In step S101, receiving the phoneme data corresponding to the purchase data at the receiving section 11, the terminal apparatus 30 stores the received phoneme data into the storage section 33. Further, the server apparatus 10 retrieves the image data constituting the Web page shown in FIG. 15 from the accumulating section 21 and sends the retrieved image data to the terminal apparatus 30. Receiving the image data, the terminal apparatus 30 displays a screen of a test-listening synthetic speech list onto the display section 37 in step S102. As shown in FIG. 15, in addition to the configuration of the screen 41 shown in FIG. 6, this screen 81 has as many synthetic speech list display sections 82 as there are speakers of the purchased phoneme data, these list display sections 82 displaying lists of synthetic speeches of speakers purchased by the user and other users generated upon the purchase. On the right side of the title of each of the synthetic speeches constituting the synthetic speech list display sections 82, a listen button 83 for test-listening to the synthetic speech is arranged.

When, to listen to the synthetic speech of a speaker of the phoneme data purchased by the user and generated by other users, the user clicks the listen button 46 on the screen 41 through the operating section 38, the terminal apparatus 30 sends the selected data for identifying the synthetic speech of the user-selected speaker to the server apparatus 10 in step S103.

In step S104, receiving the select data from the terminal apparatus 30, then the server apparatus 10 searches for the synthetic speech corresponding to the select data in step S105. In step S1106, the server apparatus 10 sends the synthetic speech retrieved by the search section 15 to the terminal apparatus 30. In step S107, receiving the synthetic speech from the server apparatus 10, then the terminal apparatus 30 performs predetermined text-to-speech synthesis processing on the received synthetic speech and sounds the resultant synthetic speech from the loudspeaker 36 in step S108. Consequently, the user can know an optimum combination between the purchased phoneme data and drama by referencing the combinations between the phoneme data purchased by the user and drama which are practiced by other users.

In step S109, the terminal apparatus 30 generates the synthetic speech corresponding to the drama data. To be more specific, the language analyzing section 22 performs language analysis on the drama data on the basis of the contents of the word dictionary database 26 and the grammar rule database 27. Next, the speech symbol generating section 23 generates a sequence of speech symbols on the basis of the contents of the generation rule database 28. The text-to-speech synthesizing section 24 extracts the phoneme data of the speaker from the first storage section 12 and links the extracted phoneme data in accordance with the generated sequence of speech symbols. In step S110, the terminal apparatus 30 sounds the synthetic speech from the loudspeaker 36. Consequently, the user's drama data are outputted from the loudspeaker 36 in step S82. Thus, the user can readily make the desired drama selected in the home page for example be recited by a user-selected speaker.

Also, in the above-mentioned example, the fee-charge processing is performed by the server apparatus 10. It will be apparent that the fee-charge processing is alternatively performed by the terminal apparatus 30. In this case, the server apparatus 10 sends the fee-charge data along with the phoneme data to the terminal apparatus 30, which performs diminution processing on the prepaid card connected to the fee-charge processing section in accordance with these fee-charge data.

Figure 16:
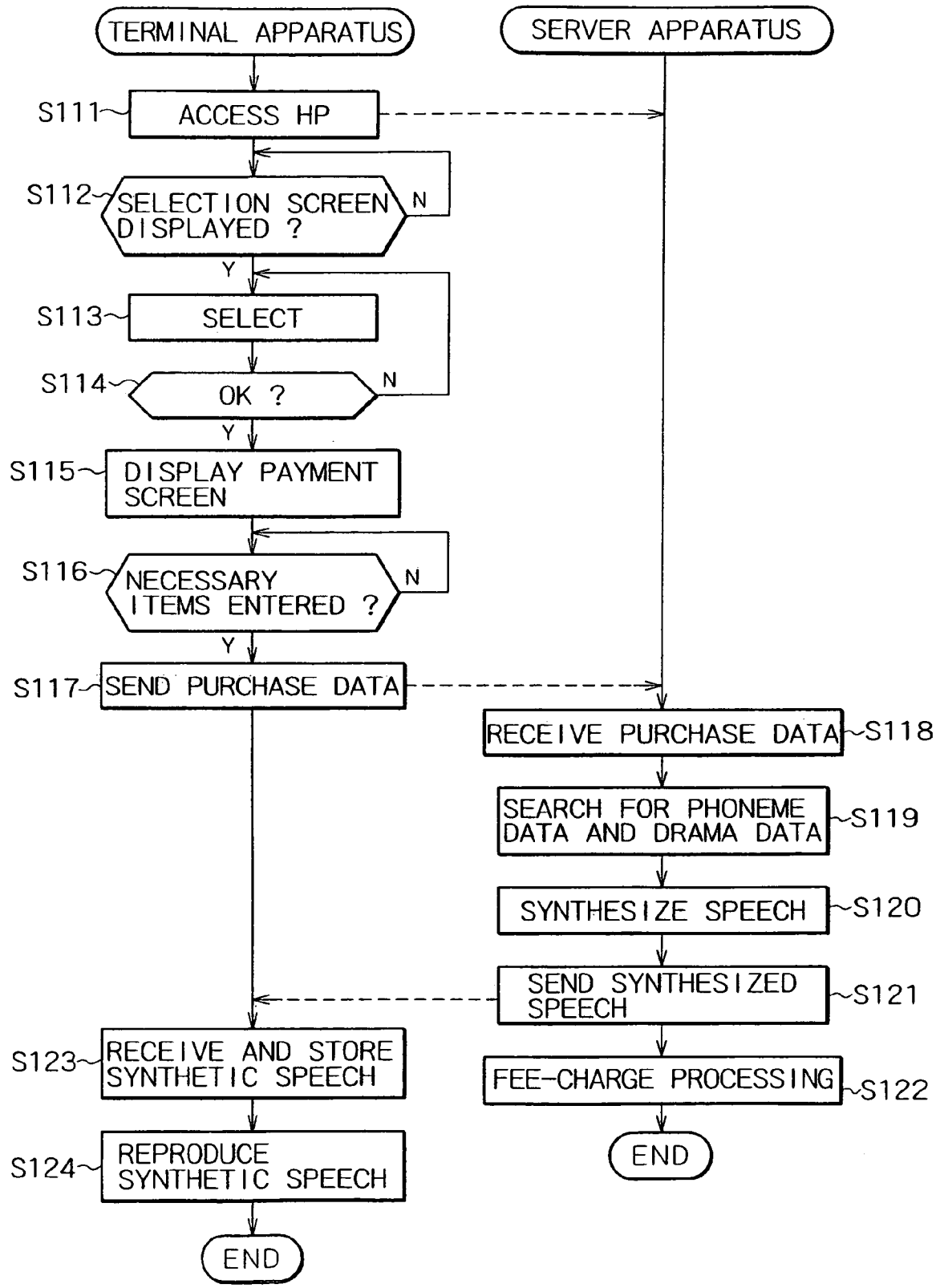
FIG. 16 is a flowchart describing a sequence of procedures for a user to select drama data and a speaker on the home page to purchase phoneme data.

Also, the present system 1 may select drama data to download a synthetic speech as shown in FIG. 16.

Figure 17:
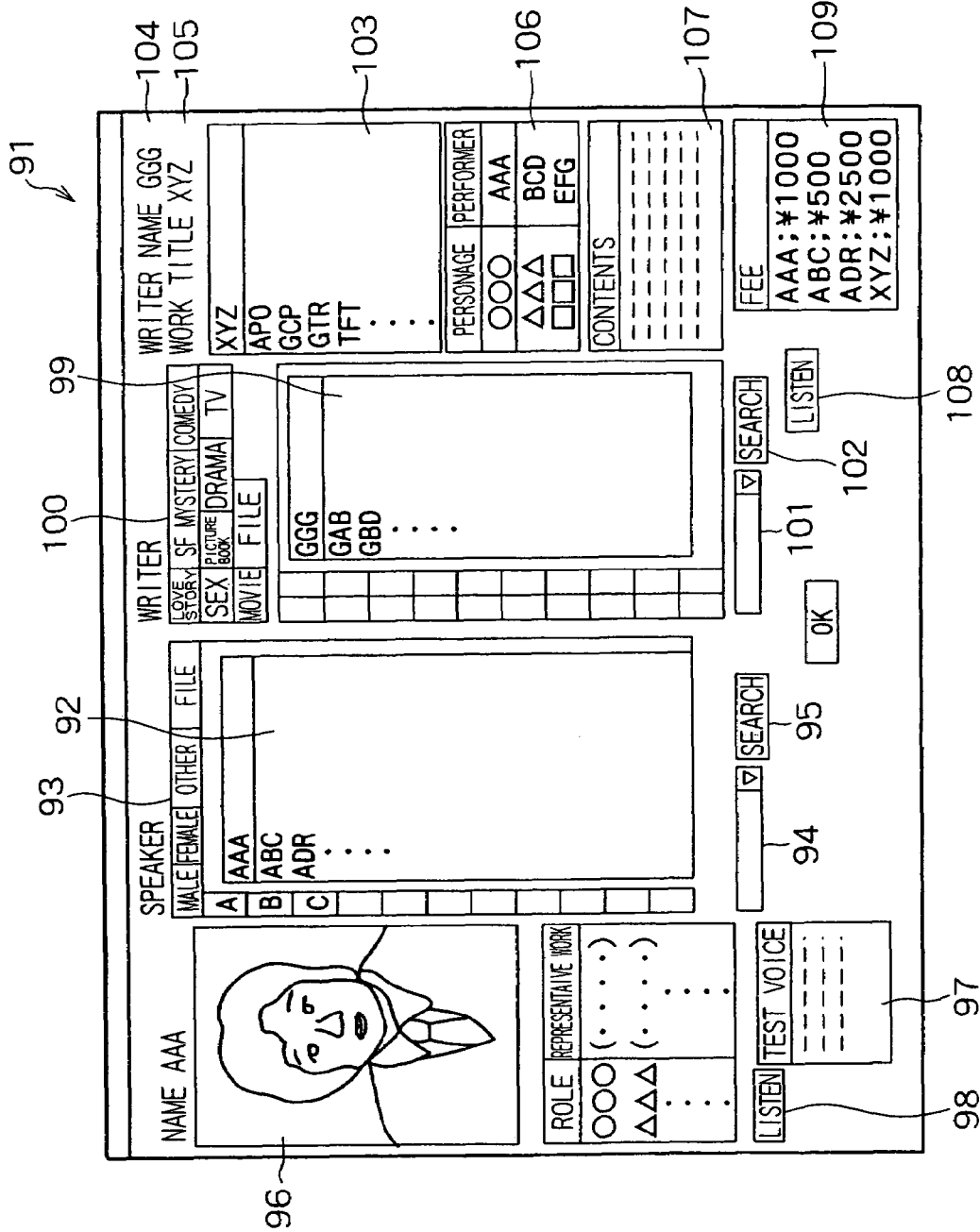
FIG. 17 is a schematic diagram illustrating a select screen from which a speaker and a drama are selected.

To be more specific, in step S111, the terminal apparatus 30 accesses the home page of the system 1 located at a predetermined URL. Then, the server apparatus 10 retrieves the image data constituting the home page from the accumulating section 21 and sends the retrieved image data to the terminal apparatus 30. The terminal apparatus 30 downloads the image data constituting a select screen 91 shown in FIG. 17. In step S112, the terminal apparatus 30 determines whether or not the select screen 91 is displayed on the display section 37. If the select screen 91 is found displayed, then the terminal apparatus 30 goes to step 113; otherwise, the terminal apparatus 30 repeats step S112 to repeat the download request.

In step S113, the terminal apparatus 30 selects a speaker and drama data as specified by the user. The description will be made by use of the select screen 91, for example. The select screen 91 has a speaker list display section 92 for displaying selectable speakers, a speaker search condition specification section 93 for specifying search conditions for searching for desired speakers, a speaker search condition input section 94 for entering search conditions for searching for a desired speaker, a search execution button 95 for executing search on the basis of the search conditions entered in the speaker search condition input section 94, a speaker display section 96 for displaying the photograph and name of the selected speaker, a speech lines display section 97 for displaying the representative speech lines of the selected speaker, and a speech lines listen button 98 for test-listening to the speech lines displayed in the speech lines display section 97.

In addition, the select screen 91 has a writer list display section 99 for displaying selectable writers, a writer search condition specification section 100 for specifying search conditions for searching for a writer for example, a writer search condition input section 101 for entering writer search conditions in character, and a search execution button 102 for executing the search on the basis of the search conditions entered in the writer search condition input section 101.

Also, the select screen 91 has a work list display section 103 for displaying selectable works, a writer name display section 104 for displaying the name of a selected writer, a work name display section 105 for displaying the name of a selected work, a work detail display section 106 for displaying a personage in the selected work and the name of performer who plays the personage, a work contents display section for displaying the contents of the selected work, a work listen button 108 for test-listening to part of the selected work, a fee display section 109 for displaying the fees to be paid to the selected work and speaker, and an OK button 110 to go to a payment screen 111 in which a fee payment preference is entered after selecting a speaker and a drama.

The following describes a procedure for selecting works and speakers by use of the above-mentioned select screen 91. First, an example in which the user searches for a desired work by means of speakers will be described with reference to FIG. 18. In step S131, through the operating section 38 of the terminal apparatus 30, the user enters the search conditions such as male or female, an initial of writer, and so on. The user enters the name of a speaker into the speaker search condition input block 94 and clicks the search execution button 95. Then, the terminal apparatus 30 sends the speaker search data to the server apparatus 10, which sends back the speaker name data based on the received speaker search condition data to the terminal apparatus 30. In step S132, the terminal apparatus 30 displays the names of the speakers matching the search conditions onto the speaker list display section 92 of the select screen 91 displayed on the display section 37.

In step S133, through the operating section 38, the user selects one of the speakers displayed in the speaker list display section 92. Then, the terminal apparatus 30 sends the select data of the selected speaker to the server apparatus 10, which searches for the photograph data and so on of the selected speaker corresponding to the select data and sends the retrieved photograph data and so on to the terminal apparatus 30. Consequently, the photograph and name of the selected speaker are displayed on the speaker display section 96 of the select screen 91 displayed on the display section 37 of the terminal apparatus 30 and the representative speech lines of the selected speaker are displayed on the speech lines display section 97.

In step S134, when, through the operating section 38, the user clicks the speech lines listen button 98, the terminal apparatus 30 requests the server apparatus 10 for downloading the test-lisening data from the transmitting section 39. Receiving the downloading request from the terminal apparatus 30, the server apparatus 10 causes the search section 15 to search the synthetic speech database construction in the second storage section and sends the retrieved synthetic speech to the terminal apparatus 30. Receiving the synthetic speech, the terminal apparatus 30 sounds the received synthetic speech from the loudspeaker 36. Consequently, the user can test-listen to the representative speech lines of the selected speaker to use the test-listening as a reference for speaker selection.

In response to the select data of the speaker supplied from the terminal apparatus 30, the server apparatus 10 searches the drama database construction in the third storage section 14 and sends the retrieved data associated with the drama played by the speaker indicated by the select data to the terminal apparatus 30. Consequently, in step S135, the terminal apparatus 30 displays a list of works played by the selected speaker onto the work list display section 103.

In step S136, through the operating section 38, the user selects one of the works listed in the work list display section 103. Then, the terminal apparatus 30 sends the select data of the selected work to the server apparatus 10. The server apparatus 10 searches on the basis of the received select data the drama database constructed in the third storage section 14, extracts the personage and representative speech lines for example, the sends them to the terminal apparatus 30. Consequently, in step S137, the name of the performer corresponding to the personage of the work selected by the user is displayed in the work detail display section 106 of the select screen 91 displayed on the display section 37 of the terminal apparatus 30 and the representative speech lines of the selected work are displayed in the work contents display section 107.

In step S138, when, through the operating section 38, the user clicks the work listen button 108, the terminal apparatus 30 requests the server apparatus 10 for downloading the test-listening data from the transmitting section 39. Receiving the download request from the terminal apparatus 30, the server apparatus 10 causes the search section 15 to search the synthetic speech database constructed in the second storage section and sends the retrieved synthetic speech to the terminal apparatus 30. The terminal apparatus 30 sounds the received synthetic speech from the loudspeaker 36. Consequently, the user can test-listen to the representative speech lines of the work displayed in the work contents display section 107 to use the test-listening as a reference for work selection.

It should be noted that, for the performer corresponding to the personage displayed in the work detail display section 106, a personal as specified by the drama is displayed as default; however, this speaker may be changed as required by the user, of which details will be described later.

In step S139, the server apparatus 10 causes the search section 15 to search the fee database constructed in the fifth storage section 20 for the fees of the speaker and drama selected by the user and sends the retrieved fee data to the terminal apparatus 30. The terminal apparatus 30 displays the fees of the currently selected speaker and work onto the fee display section 109 of the select screen 91 displayed on the display section 37.

Figure 19:
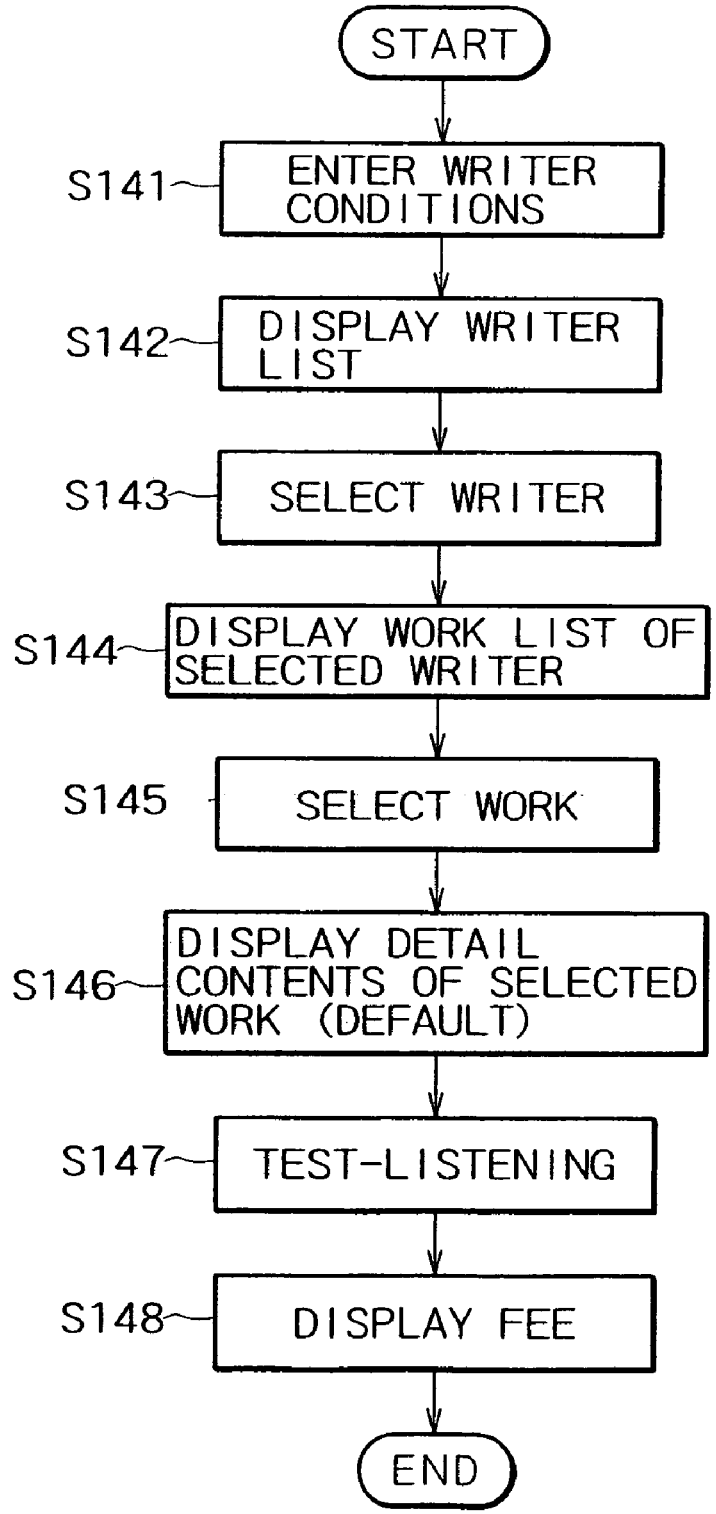
FIG. 19 is a flowchart describing a procedure for a user to search writers and writers for desired works.

The following describes an example in which the user searches for a desired work by means of writers and writers for example with reference to FIG. 19. In step S141, through the operating section 38 of the terminal apparatus 30, the user enters search conditions such as male or female, initial of speaker, genre such as love story or mystery, and so on into the writer search condition specification section 100. In addition, through the operating section 38, the user enters the name of writer for example into the writer search condition input section 101 and then clicks the search execution button 102. Then, the terminal apparatus 30 sends the writer search condition data to the server apparatus 10, which sends back the writer name data based on the writer search condition data to the terminal apparatus 30. In step S142, the terminal apparatus 30 displays a list of writer names matching the search conditions onto the writer list display section 99 of the select screen 91 displayed on the display section 37.

In step S143, through the operating section 38, the user selects one of the writers for example displayed in the writer list display section 99. Then, the terminal apparatus 30 sends the select data of writer to the server apparatus 10. The server apparatus 10 searches, on the basis of the select data, the drama database constructed in the third storage section 14 and sends the retrieved the data of drama title for example to the terminal apparatus 30. Consequently, in step S1144, the works created by the selected writer is listed in the work list display section 103 of the select screen 91 displayed on the display section 37 of the terminal apparatus 30.

In step S145, through the operating section 38, the user selects one of the works listed in the work list display section 103. The terminal apparatus 30 sends the select data of the selected work to the server apparatus 10. The server apparatus 10 searches, on the basis of the received select data, the drama database constructed in the third storage section 14 for the personage and representative speech lines for example and sends the retrieved data to the terminal apparatus 30. Consequently, in step S146, the name of the performer corresponding to the personage of the user-selected work is displayed in the work detail display section 106 of the select screen 91 displayed on the display section 37 of the terminal apparatus 30 and the representative speech lines of the selected work are displayed in the work contents display section 107.

In step S147, when, through the operating section 38, the user clicks the work listen button 108, the terminal apparatus 30 requests the server apparatus 10 for downloading the test-listening data from the transmitting section 39. In response, the server apparatus 10 causes the search section 15 to search the synthetic speech database constructed in the second storage section and sends the retrieved synthetic speech to the terminal apparatus 30. The terminal apparatus 30 sounds the received synthetic speech from the loudspeaker 36. Consequently, the user can test-listen to the representative speech lines of the work displayed in the work contents display section 107 to use the test-listening as a reference for work selection.

It should be noted that, for the performer corresponding to the personage displayed in the work detail display section 106, a personal as specified by the drama is displayed as default; however, this speaker may be changed as required by the user, of which details will be described later.

In step S148, the server apparatus 10 causes the search section 15 to search the fee database constructed in the fifth storage section 20 for the fees of the speaker and drama selected by the user and sends the retrieved fee data to the terminal apparatus 30. The terminal apparatus 30 displays the fees of the currently selected speaker and work onto the fee display section 109 of the select screen 91 displayed on the display section 37.

Figure 18:
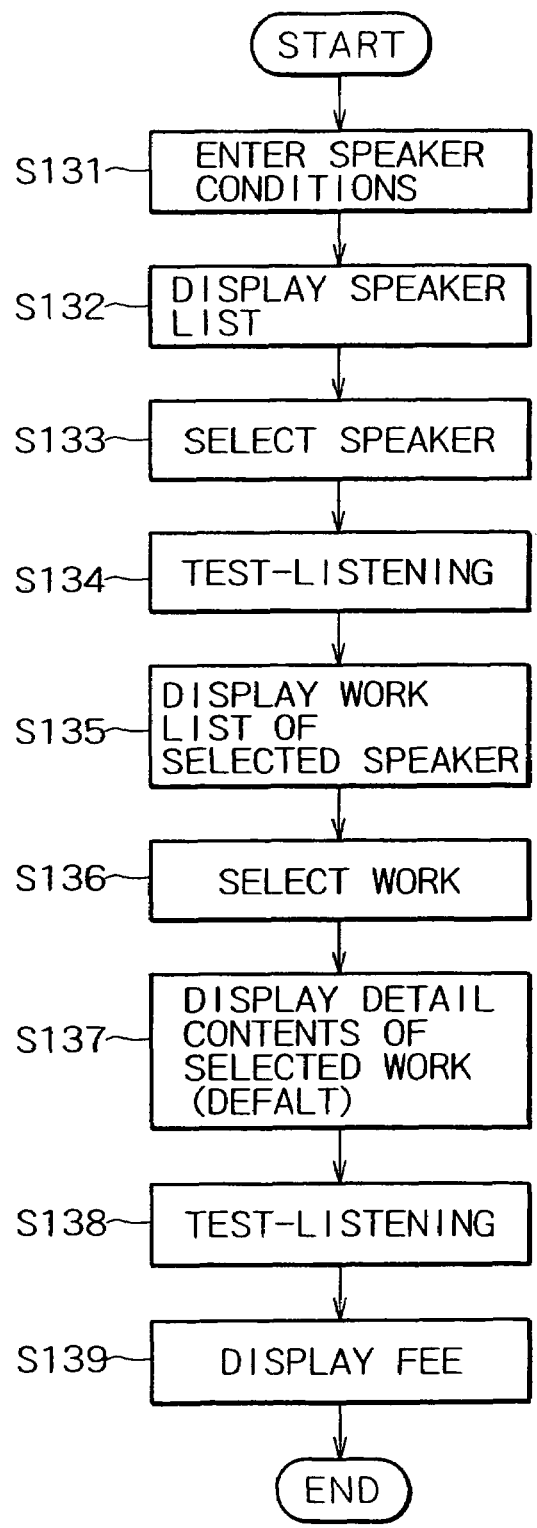
FIG. 18 is a flowchart describing a procedure for a user to search speakers for desired works.
Figure 20:
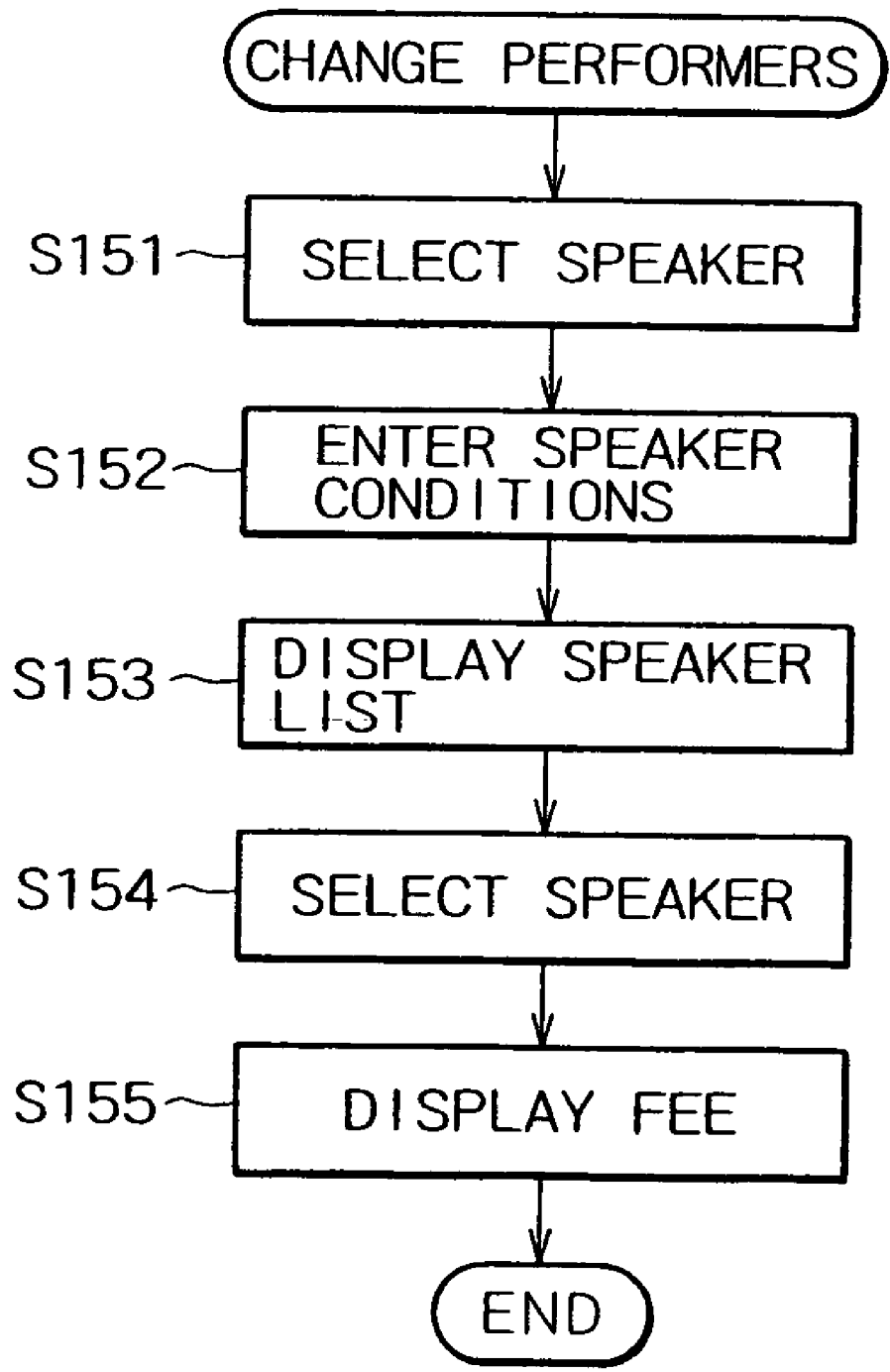
FIG. 20 is a flowchart describing a procedure for changing speakers.

The following describes, with reference to FIG. 20, a procedure for changing the speaker displayed as the default performer corresponding to the personage of the work selected in step S137 shown in FIG. 18 or step S1146 shown in FIG. 19 to another desired speaker.

In step S151, through the operating section 38, the user selects the speaker to be changed in the work detail display section 106. In step S152, through the operating section 38 of the terminal apparatus 30, the user enters search conditions such as male or female, initial of speaker and so on into the speaker search condition specification section 93. Then, through the operating section 38, the user enters the name of speaker into the speaker search condition input section 94 and clicks the search execution button 95. Then, the terminal apparatus 30 sends the speaker search condition data to the server apparatus 10. The server apparatus 10 sends back the name of the speaker based on the received speaker search condition data. In step S153, the terminal apparatus 30 lists the names of the speakers matching the search conditions onto the speaker list display section 92 of the select screen 91 displayed on the display section 37.

In step S154, through the operating section 38, the user selects one of the speakers displayed in the speaker list display section 92. Then, the terminal apparatus 30 sends the select data of the selected speaker to the server apparatus 10. The server apparatus 10 searches for the speaker's photograph and so on corresponding to the select data and sends back the retrieved data to the terminal apparatus 30. Consequently, the photograph and name of the selected speaker are displayed in the speaker display section 96 of the select screen 91 displayed on the display section 37 of the terminal apparatus 30 and the representative speech lines of the selected speaker are displayed in the speech lines display section 97.

As with step S1134 of FIG. 18, the user can test-listen to the representative lines of the selected speaker by clicking the speech lines listen button 98 through the operating section 38.

In step S155, the server apparatus 10 causes the search section 15 to search the fee database constructed in the fifth storage section 20 for the fee of the newly selected speaker and sends the retrieved fee data to the terminal apparatus 30. The terminal apparatus 30 displays the fees of the speaker and work after the speaker change onto the fee display section 109 of the select screen 91 displayed on the display section 37.

In step S114 of FIG. 16, the terminal apparatus 30 determines whether or not the OK button 110 in the select screen 91 displayed on the display section 37 has been clicked through the operating section 38. If the OK button 110 is found clicked, the terminal apparatus 30 sends the above-mentioned data to the server apparatus 10; otherwise, the terminal apparatus 30 returns to step S113.

Figure 21:
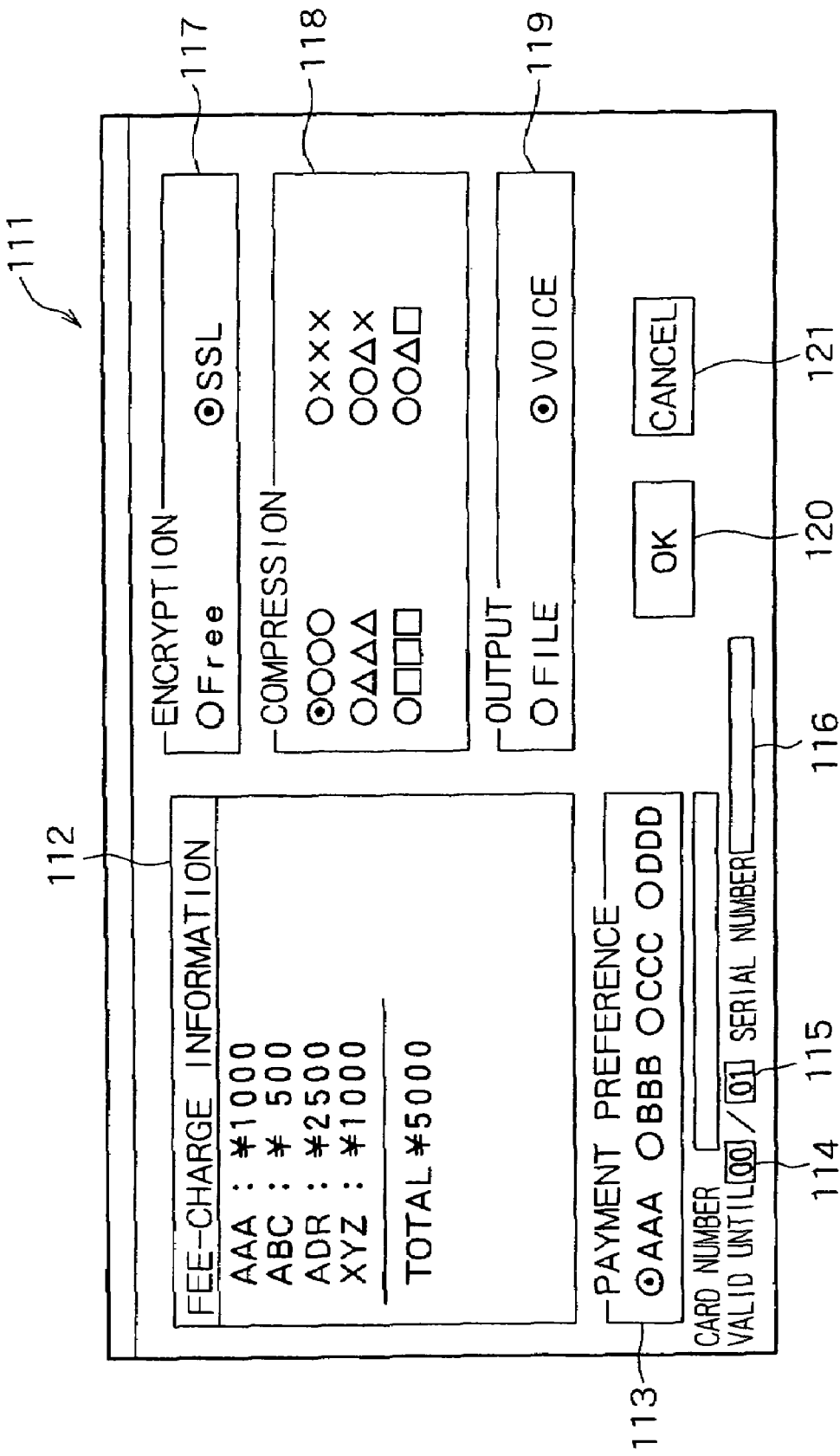
FIG. 21 is a schematic diagram illustrating a payment screen.

When the OK button 110 is found clicked through the operating section 38 and, receiving the data of clicking, the server apparatus 10 sends the image data constituting a payment screen as shown in FIG. 21 to the terminal apparatus 30. Then, in step S115, the terminal apparatus 30 displays the payment screen 111 onto the display section 37. As shown in FIG. 21, the payment screen 111 has a fee-charge information display section 112 for displaying the fee-charge information about the selected speaker and work for example, a payment preference input section 113 for displaying the type of user's credit card for making settlement, a card number input section 114 in which the identification number of the credit card is entered, a validity input section 115 in which the validity of the credit card is entered, and a serial number input section 116 in which the serial number of the application program installed by the user in the terminal apparatus 30 is entered. Also, the payment screen 111 has an encryption method select section 117 for selecting the encryption of data when sending the drama data and synthetic speeches for example from server apparatus 10 to the terminal apparatus 30, a compression method select section 118 for selecting a method of data compression when sending drama data and synthetic speeches for example from the server apparatus 10 to the terminal apparatus 30, an output format select section 119 for selecting a data output format to the terminal apparatus 30, an OK button 120 for acknowledging the sending of these entered data to the server apparatus 10, and a cancel button 121 for canceling the payment screen 111 to return to the select screen 91. The encryption method select section 117 allows the user to select between no encryption of the data to be sent from the server apparatus 10 for example and the encryption based on SSL (Secure Sockets Layer) for example. The compression method select section 118 allows the user to select between ATRAC3 (Adaptive Transform Acoustic Coding 3 (trademark)), MP3 (MPEG-1 Audio Layer 3 (trademark)), TwinVQ (Transform-Domain Weighted Interleave Vector Quantization (trademark)), and MS Audio (WMA: Windows Media Audio (trademark)) for example.

When the user enters the input items of the payment screen 111 and clicks the OK button through the operating section 38, then the terminal apparatus 30 determines in step S116 whether or not the necessary input items of the payment screen have been all entered. If the necessary items are found all entered, then the terminal apparatus 30 goes to step S117; otherwise, the terminal apparatus 30 repeats the process of step S116. In step S117, sends the data entered in the select screen 91 and the data entered in the payment screen 111 to the server apparatus 10.

In step S118, receiving the purchase data from the terminal apparatus 30, then, in step S119, server apparatus 10 causes the search section 15 to search, on the basis of the purchase data, the phoneme database constructed in the first storage section 12 and the drama database constructed in the third storage section 14 and supplies the retrieved data to the text-to-speech synthesis processing section 16. In step S120, the server apparatus 10 causes the text-to-speech synthesis processing section 16 to link the phoneme data to perform text-to-speech synthesis processing. To be more specific, the language analyzing section 22 performs language analysis on the drama data on the basis of the contents of the word dictionary database 26 and the grammar rule database 27. Next, the speech symbol generating section 23 generates a sequence of speech symbols on the basis of the contents of the generation rule database 28. The text-to-speech synthesizing section 24 extracts the phoneme data of the speaker from the first storage section 12 and links the extracted phoneme data in accordance with the generated sequence of speech symbols.

In step S121, the server apparatus 10 sends the synthetic speech corresponding to the purchase data from the transmitting section 17 to the terminal apparatus 30. Also, the server apparatus 10, upon sending of the phoneme data to the terminal apparatus 30, causes the fee-charge processing section 19 to generate fee-charge data by referencing the fee database in the fifth storage section 20, storing the generated fee-charge data into the user management database constructed in the fourth storage section 18. Then, the server apparatus 10 sends the fee-charge data to the settlement center 3. Also, when a predetermined period has passed, the server 10 may be adapted to sent the fee-charge data to the settlement center 3 on a monthly basis for example.

In step S123, the terminal apparatus 30 stores the synthetic speech corresponding to the purchase data at the receiving section 11 into storage section 33. In step S1124, when a reproduction operation is performed through the operating section 38, the terminal apparatus 30 sounds the synthetic speech from the loudspeaker 36. Thus, the user can readily make a user-written drama for example be recited by a user-selected speaker.

Also, in the above-mentioned example, the fee-charge processing is performed by the server apparatus 10. It will be apparent that the fee-charge processing is alternatively performed by the terminal apparatus 30. In this case, the server apparatus 10 sends the fee-charge data along with the phoneme data to the terminal apparatus 30, which performs diminution processing on the prepaid card connected to the fee-charge processing section in accordance with these fee-charge data. In the above-mentioned examples, text-to-speech synthesis processing is performed by the server apparatus 10. In the present example, text-to-speech synthesis processing may alternatively performed by the terminal apparatus 30.

Figure 22:
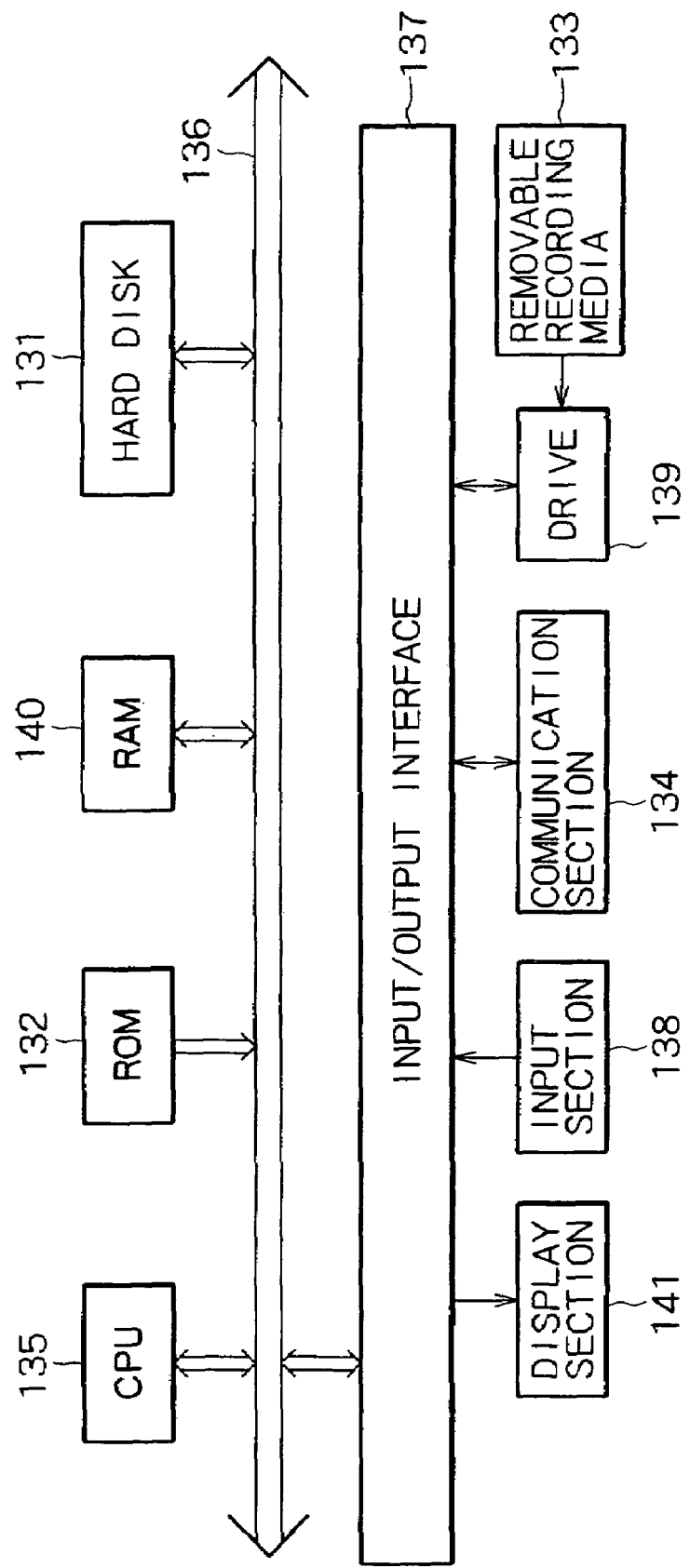
FIG. 22 is a block diagram illustrating an exemplary configuration of a computer.

It should be noted that the above-mentioned sequence of processing operations performed by the server apparatus 10 and the terminal apparatus 30 may alternatively performed by means of computer software. In this case, the programs constituting this software are installed on a general-purpose personal computer or a single-chip microprocessor for example. FIG. 22 illustrates an exemplary configuration of a computer on which the above-mentioned software programs for executing the above-mentioned sequence of processing operations are installed.

The above-mentioned software programs may be stored in advance in such recording media built in the computer as a hard disk 131 or a ROM (Read Only Memory) 132. Also, the software programs may be stored (or recorded) temporarily or permanently on such removable recording media 133 as flexible magnetic disc, CD-ROM (Compact Disc Read Only Memory), MO (Magneto Optical) disc, DVD (Digital Versatile Disc), magnetic disc, and semiconductor memory. These removable recording media 133 may be provided as so-called package software.

In addition to being installed from the removable recording media 133 onto the computer, the above-mentioned software programs may be transferred in a wireless manner from a download site via a digital broadcasting satellite or in a wired manner via a network such as a LAN (Local Area Network) or the Internet, the transferred software programs being received at a communication section 134 to be integrated in the hard disk 131.

The computer incorporates a CPU (Central Processing Unit) 135. The CPU 135 is connected to an input/output interface 137 via a bus 136. When an input section 139 constituted by a keyboard and a mouse is operated by the user to enter commands via the input/output interface 137, the CPU 135 accordingly executes the programs stored in the ROM 132.

Alternatively, the CPU 135 loads, for execution into a RAM (Random Access Memory) 140, the software programs stored in the hard disk 131, the software programs transferred from a digital broadcasting satellite, received at the communication section 134, and stored in the hard disk 131, or the software programs read from the removable recording media 133 loaded in a drive 139 and stored in the hard disk 131.

Consequently, the CPU 135 performs the processing by following the above-mentioned flowcharts or the processing as defined by the configuration of the above-mentioned block diagram. Then, the CPU 135 outputs the results of the processing from an output section 141 constituted by an LCD and a loudspeaker via the input/output interface 137 or sends the results of the processing from the communication section 134, and stores the results of the processing in the hard disk 131.

It should be note that the process steps for describing a program for making the computer execute various processing operations may not always be followed in a time-series manner described as a flowchart; rather, these process steps include the processes which are executed in parallel or in a discrete manner (for example, parallel processing or object processing).

Each of the above-mentioned software programs may be processed by a single unit of computer or a plurality of computers in a distributed manner. In addition, each of the above-mentioned software programs may be transferred to a remote computer for execution.

As described and according to the invention, the phoneme data of a plurality of speakers are stored in a storage device and the user retrieves desired phoneme data from the storage device to use the retrieved phoneme data for pay. Consequently, the user can perform text-to-speech synthesis on the desired input data such as drama data by use of the obtained phoneme data.

While the preferred embodiments of the present invention have been described using specific terms, such description is for illustrative purposes only, and it is to be understood that changes and variations may be made without departing from the spirit or scope of the following claims.

What is claimed is:

1. A text-to-speech synthesis apparatus comprising:
storage means for storing phoneme data of a plurality of speaker voices;
selecting means for selecting at least two speaker voices from said plurality of speaker voices;
searching means for searching said storage means for phoneme data of the speaker voices selected by said selecting means; and
text-to-speech synthesis processing means for linking said phoneme data of said speaker voices retrieved by said searching means to convert input data into a synthetic speech;
wherein said text-to-speech synthesis processing means can convert said input data into a synthetic speech including at least two speaker voices.

2. The text-to-speech synthetic apparatus according to claim 1, wherein said input data includes at last two parts and said selecting means selects speaker voices corresponding to each part of said input data.

3. The text-to-speech synthetic apparatus according to claim 2, wherein said input data includes conversation parts of at least two characters and selecting means selects speaker voices corresponding to each character in the conversation parts.

4. The text-to-speech synthetic apparatus according to claim 1, wherein said speaker voices includes at least one voice of celebrities, entertainers, actors, actresses, voice actors, politicians, characters of movies or animations.

5. The text-to-speech synthetic apparatus according to claim 1, further comprising:
fee-charge control means for controlling a fee-charge operation for the said user in accordance with said phoneme data selected by said selecting means,
wherein said fee-charge control means sends, to an external settlement center, fee-charge data corresponding to said phoneme data selected by said selecting means.

6. The text-to-speech synthesis apparatus according to claim 1, wherein said storage means stores prosody data for each of said plurality of speaker voices, said searching means searches for said prosody data along with said phoneme data of the speaker voice selected by said selecting means, and said text-to-speech synthesis processing means converts said input data into a synthetic speech on a basis of said searched phoneme data and said prosody data.

7. The text-to-speech synthesis apparatus according to claim 1, wherein said input data is at least one of voice data and text data.

8. The text-to-speech synthesis apparatus according to claim 1, further comprising input means for directly inputting said input data.

9. The text-to-speech synthesis apparatus according to claim 1, further comprising communication means for receiving said input data via a network.

10. The text-to-speech synthesis apparatus according to claim 1, wherein said storage means stores script data and said text-to-speech synthesis processing means links said phoneme data of said speaker voices searched by said searching means to convert said script data into a synthetic speech.

11. The text-to-speech synthesis apparatus according to claim 10, wherein said storage means stores said script data in a classified manner and said selecting means selects said script data along with said one speaker.

12. The text-to-speech synthesis apparatus according to claim 10, wherein said script data is at least one of voice data and text data.

13. A text-to-speech synthesis apparatus comprising:
selecting means for selecting at least two speaker voices;
transmitting means for transmitting speaker voice identification data for identifying said speaker voices selected by said selecting means to another apparatus;
receiving means for receiving phoneme data of said speaker voices corresponding to said speaker voice identification data transmitted from said transmitting means; and
text-to-speech synthesis processing means for linking said phoneme data of said speaker voices received by said receiving means to convert input data into a synthetic speech,
wherein said text-to-speech synthesis processing means can convert said input data into a synthetic speech including at least said two speaker voices including said speaker voice corresponding to said speaker voice identification data.

14. The text-to-speech synthesis apparatus according to claim 13, wherein said input data includes at least two parts and said selecting means selects speaker voices corresponding to each part of said input data.

15. The text-to-speech synthesis apparatus according to claim 13, wherein said input data includes conversation parts of at least two characters and selecting means selects speaker voices corresponding to each character in the conversation parts.

16. The text-to-speech synthesis apparatus according to claim 13, wherein said speaker voices includes at least once voice of celebrities, entertainers, actors, actresses, voice actors, politicians, characters of movies or animations.

17. The text-to-speech synthesis apparatus according to claim 13, further comprising:
fee-charge control means for controlling a fee-charge operations for the said user in accordance with said phoneme data selected by said selecting means,
wherein said fee-charge control means sends, to an external settlement center, fee-charge data corresponding to said phoneme data to be received by said receiving means.

18. The text-to-speech synthesis apparatus according to claim 13, wherein said input data is at least one of voice data and text data.

19. The text-to-speech synthesis apparatus according to claim 13, further comprising input means for directly inputting said input data.

20. The text-to-speech synthesis apparatus according to claim 13, further comprising communication means for receiving said input data via a network.

21. The text-to-speech synthesis apparatus according to claim 13, wherein said selecting means selects script data as specified by said user; said transmitting means transmits, to another apparatus, script identification data for identifying said script data selected by said selecting means; said receiving means receives phoneme data of a speaker voice corresponding to said speaker voice identification data transmitted by said transmitting means and said script data corresponding to said script identification data; said text-to-speech synthesis processing means links said phoneme data of said speaker voice received by said receiving means to convert said script data into a synthetic speech.

22. The text-to-speech synthesis apparatus according to claim 21, wherein said receiving means receives said synthetic speech of said SCRIPT data obtained by said another apparatus on the basis of said speaker voice identification data and said script identification data transmitted by said transmitting means.

23. The text-to-speech synthesis apparatus according to claim 21, wherein said script data is at least one of voice data and text data.

24. A text-to-speech synthesis apparatus comprising:
a memory for storing phoneme data of a plurality of speaker voices;
a selecting section for selecting any one of said plurality of speaker voices;
a search section for searching said memory for the phoneme data of the speaker voices selected by said selecting section;
a text-to-speech synthesis processing section for linking said phoneme data of said speaker voices retrieved by said search section to convert script data into a synthetic speech;
a storage section for accumulating said synthetic speech converted from said script data on the basis of the phoneme data of said plurality of speaker voices; and
a reproducing section for retrieving said synthetic speech of said speaker voices selected by said selecting section and reproducing said synthetic speech,
wherein said text-to-speech synthesis processing means can convert said script into a synthetic speech including at least said two speaker voices including said speaker voice corresponding to said speaker voice identification data.

25. The text-to-speech synthesis apparatus according to claim 24, wherein said script includes at least two parts and said selecting means selects speaker voices corresponding to each part of said script.

26. The text-to-speech synthesis apparatus according to claim 24, wherein said script includes conversation parts of at least two characters and selecting means selects speaker voices corresponding to each character in the conversation parts.

27. The text-to-speech synthesis apparatus according to claim 24, wherein said speaker voices includes at least one voice of celebrities, entertainers, actors, actresses, voice actors, politicians, characters of movies or animations.

28. The text-to-speech synthesis apparatus according to claim 24, further comprising:
fee-charge control means for controlling a fee-charge operation for the said user in accordance with said phoneme data selected by said selecting means,
wherein said fee-charge control section sends, to an external settlement center, fee-charge data corresponding to the phoneme data of the one speaker selected by said selecting section.

29. The text-to-speech synthesis apparatus according to claim 24, wherein said memory stores prosody data for each of said plurality of speaker voices, said search section searches for said prosody data along with said phoneme data of said one speaker selected by said selecting section; and said text-to-speech synthesis processing section converts said script data into a synthetic speech on the basis of said user-specified phoneme data and prosody data.

30. The text-to-speech synthesis apparatus according to claim 24, wherein said script data is at least one of voice data and text data.

31. The text-to-speech synthesis apparatus according to claim 24, further comprising an input section for directly inputting said script data.

32. The text-to-speech synthesis apparatus according to claim 24, further comprising a communication section for receiving said script data via a network.

33. The text-to-speech synthesis apparatus according to claim 24, wherein said memory stores said script data and said text-to-speech synthesis processing section links said phoneme data of said speaker voice retrieved by said search section to convert said script data into a synthetic speech.

34. The text-to-speech synthesis apparatus according to claim 33, wherein said memory stores said script data in a classified manner and said selecting section selects said script data along with said speaker voice.

35. The text-to-speech synthesis apparatus according to claim 33, wherein said script data is at least one of voice data and text data.

36. A text-to-speech synthesis apparatus comprising:
a selecting section for selecting at least two speaker voices;
a transmitting section for transmitting, to another apparatus, speaker voice identification data for identifying said speaker voices selected by said selecting section;
a receiving section for receiving phoneme data of the speaker voice corresponding to said speaker voice identification data transmitted by said transmitting section and a synthetic speech of said speaker voice;
a text-to-speech synthesis processing section for linking said phoneme data of said speaker voice received by said receiving section to convert script data into a synthetic speech; and
a reproducing section for reproducing said synthetic speech received by said receiving means;
wherein said text-to-speech synthesis processing means can convert said script into a synthetic speech including at least said two speaker voices including said speaker voice corresponding to aid speaker voice identification data.

37. The text-to-speech synthesis apparatus according to claim 36, wherein said script includes at least two parts and said selecting means selects speaker voices corresponding to each part of said script.

38. The text-to-speech synthesis apparatus according to claim 36, wherein said script includes conversation parts of at least two characters and selecting means selects speaker voices corresponding to each character in the conversation parts.

39. The text-to-speech synthesis apparatus according to claim 36, wherein said speaker voices includes at least one voice of celebrities, entertainers, actors, actresses, voice actors, politicians, characters of movies or animations.

40. The text-to-speech synthesis apparatus according to claim 36, further comprising:
a fee-charge control section for controlling a fee-charge operation for said user in accordance with said phoneme data received by said receiving section;
wherein said fee-charge control section sends, to an external settlement center, fee-charge data corresponding to said phoneme data received by said receiving section.

41. The text-to-speech synthesis apparatus according to claim 36, wherein said script data is at least one of voice data and text data.

42. The text-to-speech synthesis apparatus according to claim 36, further comprising an input section for directly inputting said script data.

43. The text-to-speech synthesis apparatus according to claim 36, further comprising a communication section for receiving said script data via a network.

44. The text-to-speech synthesis apparatus according to claim 36, wherein said selecting section selects script data as specified by a user; said transmitting section transmits, to said another apparatus, script identification data for identifying script data corresponding to the speaker voice selected by said selecting section; said receiving section receives phoneme data of a speaker voice corresponding to said speaker voice identification data transmitted by said transmitting section and said script data corresponding to said script identification data; said text-to-speech synthesis processing section links said phoneme data of said speaker voice received by said receiving section to convert said script data into a synthetic speech; and said fee-charge control section controls a fee-charge operation for said user in accordance with said phoneme data of said speaker voice received by said receiving section and said script data.

45. The text-to-speech synthesis apparatus according to claim 44, wherein said receiving section receives the synthetic speech of said script data generated on said another apparatus on the basis of said speaker voice identification data and said script identification data transmitted by said transmitting section and said fee-charge control section controls a fee-charge operation for said user in accordance with said synthetic speech received by said receiving section.

46. The text-to-speech synthesis apparatus according to claim 44, wherein said script data is at least one of voice data and text data.

47. A text-to-speech synthesis method comprising the steps of:
   selecting at least two speaker voices;
   searching phoneme data of the speaker voices selected at selecting step; and
   text-to-speech synthesis processing for linking said phoneme data of said speaker voices retrieved in said searching step to convert input data into a synthetic speech,
   wherein said text-to-speech synthesis processing can convert said input data into a synthetic speech including at least said two speaker voices.

48. A computer readable recording medium device on which is stored a text-to-speech synthesis program which, when implemented by a computer, comprises acts of:
   selecting at least two speaker voices;
   searching phoneme data of the speaker voices selected at selecting step; and
   text-to-speech synthesis processing for linking said phoneme data of said speaker voices retrieved in said searching step to convert input data into a synthetic speech;
   wherein said text-to-speech synthesis processing can convert said input data into a synthetic speech including at least said two speaker voices.

49. A text-to-speech synthesis method comprising the steps of:
   selecting at least two speaker voices;
   transmitting speaker voice identification data for identifying said speaker voices selected in said selecting step to another apparatus;
   receiving phoneme data of said speaker voices corresponding to said speaker voice identification data transmitted in said transmitting step; and
   text-to-speech synthesis processing linking said phoneme data of said speaker voices received in said receiving step to convert input data into a synthetic speech;
   wherein said text-to-speech synthesis processing can convert said input data into a synthetic speech including at least said two speaker voices.

50. A computer readable recording medium device on which is stored a text-to-speech synthesis program which, when implemented by a computer, comprises acts of:
   selecting at least two speaker voices;
   transmitting speaker voice identification data for identifying said speaker voices selected in said selecting step to another apparatus;
   receiving phoneme data of said speaker voices corresponding to said speaker voice identification data transmitted in said transmitting step; and
   text-to-speech synthesis processing linking said phoneme data of said speaker voice received in said receiving step to convert input data into a synthetic speech;
   wherein said text-to-speech synthesis processing can convert said input data into a synthetic speech including at least said two speaker voices.

* * * * *